US010250592B2

(12) United States Patent
Malatesha et al.

(10) Patent No.: US 10,250,592 B2
(45) Date of Patent: *Apr. 2, 2019

(54) APPROACH FOR ACCESSING THIRD-PARTY CONTENT COLLABORATION SERVICES ON INTERACTIVE WHITEBOARD APPLIANCES USING CROSS-LICENSE AUTHENTICATION

(71) Applicant: RICOH COMPANY, LTD.

(72) Inventors: Rathnakara Malatesha, Sunnyvale, CA (US); Lana Wong, Belleville, NJ (US); Hiroshi Kitada, Tuckahoe, NY (US)

(73) Assignee: RICOH COMPANY, LTD., Tokyo (JP)

( * ) Notice: Subject to any disclaimer, the term of this patent is extended or adjusted under 35 U.S.C. 154(b) by 133 days.

This patent is subject to a terminal disclaimer.

(21) Appl. No.: 15/384,184

(22) Filed: Dec. 19, 2016

(65) Prior Publication Data

US 2018/0176207 A1 Jun. 21, 2018

(51) Int. Cl.
*H04L 29/00* (2006.01)
*H04L 29/06* (2006.01)
(Continued)

(52) U.S. Cl.
CPC .......... *H04L 63/083* (2013.01); *G06F 3/1454* (2013.01); *G06F 9/542* (2013.01);
(Continued)

(58) Field of Classification Search
None
See application file for complete search history.

(56) References Cited

U.S. PATENT DOCUMENTS 6,377,288 B1 4/2002 Moran
6,789,064 B2 9/2004 Koh
(Continued)

FOREIGN PATENT DOCUMENTS

JP 2001175720 A 6/2001
JP 2005346515 A 12/2005
(Continued)

OTHER PUBLICATIONS

Nelson, U.S. Appl. No. 15/290,856, filed Oct. 11, 2016, Office Action, dated May 31, 2018.
(Continued)

*Primary Examiner* — Fatoumata Traore
(74) *Attorney, Agent, or Firm* — Hickman Palermo Becker Bingham LLP; Edward A. Becker

(57) ABSTRACT

An approach for managing collaboration on IWBs allows users of different third-party collaboration services to participate in collaboration meetings on IWBs. The approach allows the users to use collaboration functionality provided by IWBs, such as annotation, and to communicate with each other, even though the users are using different third party collaboration services. The approach uses a collaboration manager that provides a "single wrapper" application program interface (API) and centralized management of collaboration meetings, including license key and token management, cross-license collaboration, user management and meeting management. The collaboration manager acts as a mediation layer that handles the APIs of different third-party collaboration services and allows users using heterogeneous collaboration clients to participate in collaboration meetings.

17 Claims, 15 Drawing Sheets

(51) Int. Cl.
*G06Q 10/10* (2012.01)
*G06F 3/14* (2006.01)
*G06F 9/54* (2006.01)
*H04N 7/15* (2006.01)

(52) U.S. Cl.
CPC ......... *G06Q 10/10* (2013.01); *H04L 65/4015* (2013.01); *H04N 7/15* (2013.01)

(56) References Cited

U.S. PATENT DOCUMENTS

| | | |
|---|---|---|
| 7,634,546 B1 | 12/2009 | Strickholm et al. |
| 7,693,736 B1 | 4/2010 | Chu |
| 8,266,209 B2 * | 9/2012 | Pegg ........................ H04N 7/15 709/204 |
| 8,578,463 B2 * | 11/2013 | Kee ........................ G06Q 10/10 713/172 |
| 8,594,376 B2 | 11/2013 | Ogasawara |
| 8,727,209 B1 | 5/2014 | Shih |
| 8,988,505 B2 | 3/2015 | Schaerer |
| 9,047,312 B1 | 6/2015 | Ten-Pow |
| 9,189,699 B2 | 11/2015 | Liu |
| 9,292,974 B2 | 3/2016 | Kaino |
| 9,450,758 B1 | 9/2016 | Allen |
| 9,646,420 B2 | 5/2017 | Imamura |
| 9,652,665 B2 | 5/2017 | Hanina |
| 9,769,139 B2 | 9/2017 | Chizhov |
| 9,965,159 B2 | 5/2018 | Knodt |
| 2003/0018659 A1 | 1/2003 | Fuks |
| 2004/0064322 A1 | 4/2004 | Georgiopoulos et al. |
| 2005/0027800 A1 | 2/2005 | Erickson |
| 2005/0209886 A1 | 9/2005 | Corkern |
| 2006/0031326 A1 | 2/2006 | Ovenden |
| 2006/0161446 A1 | 7/2006 | Fyfe |
| 2006/0180792 A1 | 8/2006 | Ricci |
| 2007/0106931 A1 | 5/2007 | Vartiainen |
| 2008/0022209 A1 | 1/2008 | Lyle |
| 2008/0320583 A1 | 12/2008 | Sharma |
| 2009/0006161 A1 | 1/2009 | Chen |
| 2009/0010496 A1 | 1/2009 | Saito |
| 2009/0094088 A1 | 4/2009 | Chen |
| 2009/0199113 A1 | 8/2009 | McWhinnie |
| 2010/0014719 A1 | 1/2010 | Date |
| 2010/0198644 A1 | 8/2010 | Renfro |
| 2010/0318399 A1 | 12/2010 | Li et al. |
| 2013/0007773 A1 | 1/2013 | Guilford |
| 2013/0058471 A1 | 3/2013 | Garcia |
| 2013/0073329 A1 | 3/2013 | Shoham |
| 2013/0182007 A1 | 7/2013 | Syed-Mahmood et al. |
| 2013/0325972 A1 | 12/2013 | Boston et al. |
| 2014/0149492 A1 | 5/2014 | Ananthanarayanan |
| 2014/0149494 A1 | 5/2014 | Markley |
| 2014/0180667 A1 | 6/2014 | Johansson |
| 2014/0223334 A1 | 8/2014 | Jensen et al. |
| 2014/0365918 A1 | 12/2014 | Caldwell et al. |
| 2015/0067047 A1 | 3/2015 | Fu |
| 2015/0154183 A1 | 6/2015 | Kristjansson et al. |
| 2015/0179186 A1 | 6/2015 | Swierk |
| 2016/0085604 A1 | 3/2016 | Rajagopalan |
| 2016/0092578 A1 | 3/2016 | Ganani |
| 2016/0283473 A1 | 9/2016 | Heinze et al. |
| 2016/0283676 A1 | 9/2016 | Lyon |
| 2016/0307063 A1 | 10/2016 | Bright et al. |
| 2017/0255446 A1 | 9/2017 | Malatesha |
| 2018/0101281 A1 | 4/2018 | Nelson |
| 2018/0101760 A1 | 4/2018 | Nelson |
| 2018/0101761 A1 | 4/2018 | Nelson |
| 2018/0101823 A1 | 4/2018 | Nelson |
| 2018/0101824 A1 | 4/2018 | Nelson |
| 2018/0176267 A1 | 6/2018 | Malatesha |
| 2018/0176268 A1 | 6/2018 | Malatesha |
| 2018/0182052 A1 | 6/2018 | Panagos |
| 2018/0247439 A1 | 8/2018 | Knodt |

FOREIGN PATENT DOCUMENTS

| | | |
|---|---|---|
| JP | 2015535635 A | 12/2015 |
| JP | 2016173646 A | 9/2016 |
| WO | WO01/91033 A2 | 11/2001 |
| WO | WO2016/00010 A1 | 1/2016 |
| WO | WO2017/160487 A1 | 9/2017 |

OTHER PUBLICATIONS

Knodt, U.S. Appl. No. 15/445,915, filed Feb. 28, 2017, Office Action, dated Jun. 7, 2018.
European Patent Office, "Search Report", in application No. 17206719.1-1224, dated May 4, 2018, 9 pages.
Harrer et al., "The Scalable Adapter Design Pattern: Enabling Interoperability Between Educational Interoperability Between Educational Software Tools", IEEE, vol. 1, No. 2, Apr. 1, 2008, 14 pages.
Gamma et al., "Design Patterns" Design Patterns, dated Jan. 1, 1995, 7 pages.
European Patent Office, "Search Report" in application No. 17194726.0-1222, dated Jan. 16, 2018, 7 pages.
European Patent Office, "Search Report" in application No. 17192809.6-1958, dated Dec. 6, 2017, 9 pages.
European Patent Office, "Search Report" in applicatio No. 17207179.7-1222, dated Jan. 25, 2018, 9 pages.
Malatesha, U.S. Appl. No. 15/384,187, filed Dec. 19, 2016, Office Action, dated Aug. 10, 2018.
European Patent Office, "Search Report" in application No. 18194528.8-1210, dated Nov. 27, 2018, 8 pages.
Nelson, U.S. Appl. No. 15/290,860, filed Oct. 11, 2016, Office Action, dated Nov. 16, 2018.
Nelson, U.S. Appl. No. 15/290,856, filed Oct. 11, 2016, Final Office Action, dated Nov. 20, 2018.
Nelson, U.S. Appl. No. 15/290,855, filed Oct. 11, 2016, Office Action, dated Oct. 18, 2018.
Malatesha, U.S. Appl. No. 15/384,181, filed Dec. 19, 2016, dated Office Action, dated Nov. 2, 2018.
Knodt, U.S. Appl. No. 15/445,915, filed Feb. 28, 2018, Final Office Action, dated Dec. 4, 2018.

* cited by examiner

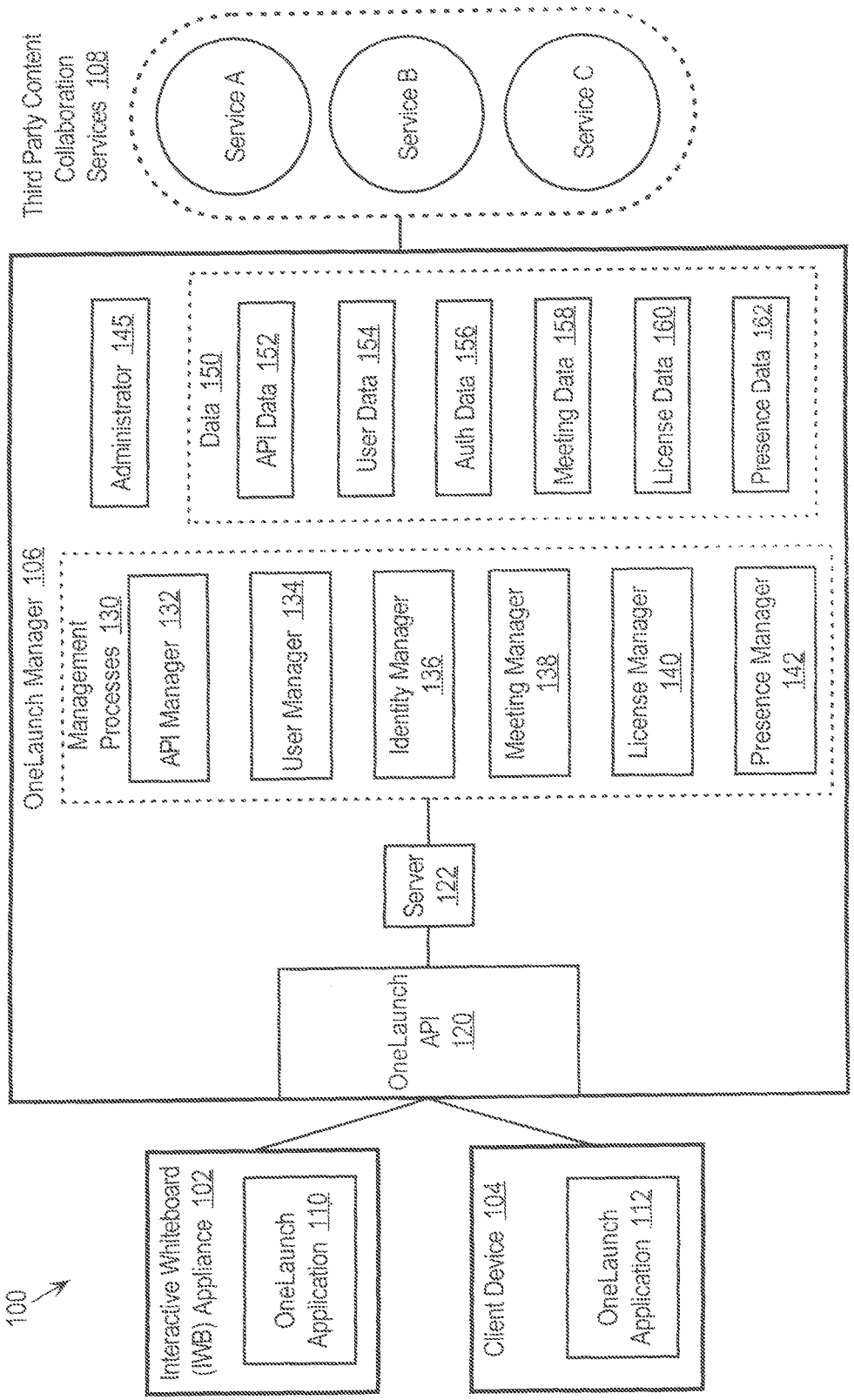

FIG. 2G

Contacts Screen 270

Views ▽ 272

| Contact | Status | |
|---|---|---|
| Contact1 | ○ | (Online, available) |
| Contact2 | ⊖ | (Online, in a meeting) |
| Contact3 | ⊜ | (Online, away) |
| Contact4 | ⊟ | (Online, do not disturb) |
| Contact5 | ⊗ | (Offline, unavailable) |
| Contact6 | Ⓒ | (Custom status) |

Return 274

| |
|---|
| Login <provider> |
| Call <contact> |
| Join <meeting> |
| Create Room <name> |
| Delete Room <name> |
| Get Room Information <name> |
| Get Room Link <name> |
| Invite <user> to Room <name> |
| Send File <name> |
| Send Invite <user> |
| Send Link <user> |
| Chat <user> |
| Chat <user><room> |
| Create Meeting <name> |
| Start Meeting <name> |
| Meeting Status <name> |
| Join Meeting <name> |

| Provider | Service | Function | API | Format | Version | Status | Default | Comments |
|---|---|---|---|---|---|---|---|---|
| Cisco | Webex | Login | https://server.cisco.com/Login/user=userA&pass=encryptedpassword | REST | 2.0 | Active | Y | |
| Cisco | Webex | Call | https://server.cisco.com/Call/src=userA&dest=userB&service=webex | REST | 2.0 | Active | Y | |
| Cisco | Webex | Message | https://server.cisco.com/Message/src=userA&dest=userB&msg="Hi User B, did you receive the updated requirements specification?" | REST | 2.0 | Active | Y | |
| ABC | Conference | Login | https://conference.abc.com/Login/user=userA&pass=encryptedpassword | REST | 1.0 | Active | Y | Preferred |
| ABC | Conference | Login | XML Request Type | XML | 3.0 | Active | N | |
| ABC | Conference | Login | SOAP Request Type | SOAP | 4.0 | Active | N | |
| IBM | Sametime | Join Call | https://server.ibm.com/JoinCall/v1/user=userA&meetingID=XYZ | REST | 1.0 | Obsolete | N | |
| IBM | Sametime | Join Call | https://server.ibm.com/JoinCall/v2/user=userA&meetingID=XYZ | REST | 2.0 | Active | Y | Preferred |
| IBM | Sametime | Join Call | https://server.ibm.com/JoinCall/v3/user=userA&meetingID=XYZ | REST | 3.0 | Active | N | |

License Key Table

| Provider | Service | Organization | License Key | Users | Expiration | Status | Comments |
|---|---|---|---|---|---|---|---|
| Cisco | Webex | XYZ | key1 | 10 | 3/7/2017 | Active | |
| ABC | Conference | XYZ | key2 | 20 | 3/6/2017 | Active | |
| IBM | Sametime | XYZ | key3 | 30 | 3/7/2017 | Active | |

User Subscription Table

| Provider | Service | Organization | User ID | Contact No | Sub Status | Comments |
|---|---|---|---|---|---|---|
| Cisco | Webex | XYZ | User1@xyz.com | 912-497-1321 | Active | |
| ABC | Conference | XYZ | User2@xyz.com | 912-497-1322 | Active | |
| IBM | Sametime | XYZ | User1@xyz.com | 912-497-1321 | Active | |
| IBM | Sametime | XYZ | User3@xyz.com | 912-497-1324 | Active | |

Authentication Token Table

| Provider | Service | Org | User ID | Authentication Token | Token Status | Expiry in | Presence |
|---|---|---|---|---|---|---|---|
| Cisco | Webex | XYZ | User1@xyz.com | a6d5g6dkish3 | Active | 30 days | Offline |
| ABC | Conference | XYZ | User2@xyz.com | dir83kfdf4rdk93 | Expired | 0 days | Offline |
| IBM | Sametime | XYZ | User1@xyz.com | dk39f97gn5kz3 | Active | 3 days | Away |
| IBM | Sametime | XYZ | User3@xyz.com | dk58dd43ls84 | Active | 10 days | Busy |

630   FIG. 6D

Cross-Licence Authentication Token Table

| Provider | Service | Org | Authentication Token | Token Status | Expiry in | Comments |
|---|---|---|---|---|---|---|
| Cisco | Webex | XYZ | a6d5g6dkish3 | Active | 30 days | |
| ABC | Conference | XYZ | dir83kfdf4rdk93 | Expired | 0 days | |
| IBM | Sametime | XYZ | dk39f97gn5kz3 | Active | 3 days | |
| IBM | Sametime | XYZ | dk58dd43ls84 | Active | 10 days | |

640   FIG. 6E

User Status Table

| Provider | Service | Organization | User ID | Contact No | User Status | Comments |
|---|---|---|---|---|---|---|
| Cisco | Webex | XYZ | User1@xyz.com | 912-497-1321 | Offline | |
| ABC | Conference | XYZ | User2@xyz.com | 912-497-1322 | Online | |
| IBM | Sametime | XYZ | User1@xyz.com | 912-497-1321 | Offline | |
| IBM | Sametime | XYZ | User3@xyz.com | 912-497-1324 | Busy | |

650   FIG. 6F

Meeting Status Table

| Meeting ID | Description | Service | Organization | User ID | Meeting Status | Comments |
|---|---|---|---|---|---|---|
| status-124 | Weekly status | Webex | XYZ | User1@xyz.com | Offline | |
| scrum-737 | Daily scrum | Conference | XYZ | User2@xyz.com | Online | |
| code review | Code review | Sametime | XYZ | User1@xyz.com | Offline | |
| patent review | Patent review | Sametime | XYZ | User3@xyz.com | Busy | |

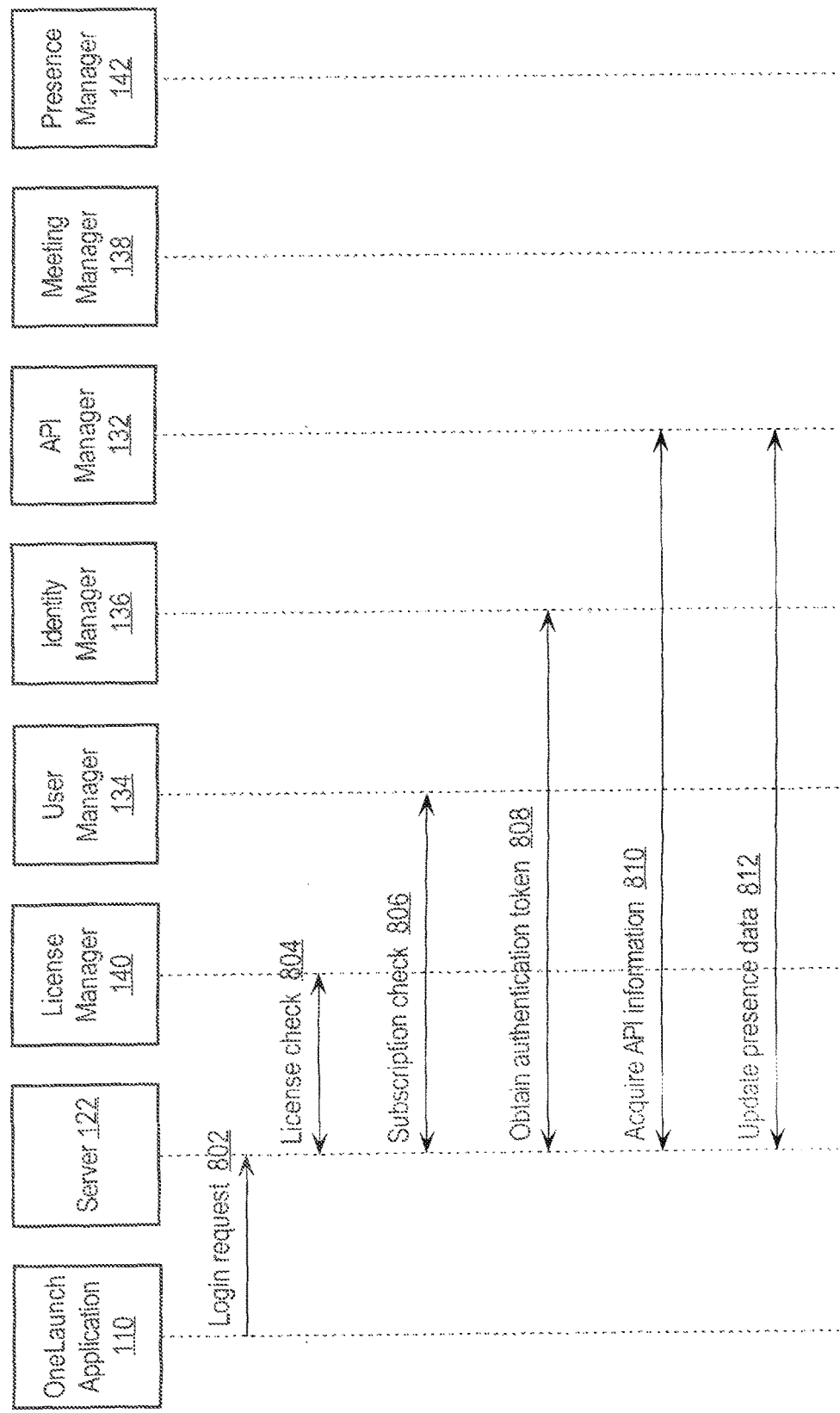

US 10,250,592 B2

APPROACH FOR ACCESSING THIRD-PARTY CONTENT COLLABORATION SERVICES ON INTERACTIVE WHITEBOARD APPLIANCES USING CROSS-LICENSE AUTHENTICATION

RELATED APPLICATION DATA

This application is related to U.S. patent application Ser. No. 15/384,181 entitled "APPROACH FOR ACCESSING THIRD-PARTY CONTENT COLLABORATION SERVICES ON INTERACTIVE WHITEBOARD APPLIANCES USING A WRAPPER APPLICATION PROGRAM INTERFACE", filed Dec. 19, 2016, and U.S. patent application No. 15/384,187 entitled "APPROACH FOR ACCESSING THIRD-PARTY CONTENT COLLABORATION SERVICES ON INTERACTIVE WHITEBOARD APPLIANCES BY AN APPLICATION USING A WRAPPER APPLICATION PROGRAM INTERFACE", filed Dec. 19, 2016, the contents all of which are incorporated by reference in their entirety for all purposes as if fully set forth herein.

FIELD

Embodiments relate generally to electronic meetings conducted over computer networks. SUGGESTED GROUP ART UNIT: 2625; SUGGESTED CLASSIFICATION: 358.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Interactive whiteboard (IWB) appliances allow users to share electronic information, such as documents and files, and collaborate in real time with other IWBs, client devices, mobile applications and third-party solutions. Some prominent features of IWBs include annotation, file sharing and syncing, OCR, as well as local functionality. For example, users in different geographical locations may view, discuss, and annotate electronic documents in real-time. IWBs may also be configured with third-party videoconferencing solutions to further facilitation real-time collaboration. Third-party videoconferencing solutions are typically implemented on IWBs using so called "shallow integration," i.e., as separate processes on top of the whiteboard that are launched via the graphical user interface menu of the IWB.

This type of "shallow integration" has some undesirable characteristics, including a limited ability to integrate IWB functionality into the third-party videoconferencing solutions, and the difficulty and added complexity in supporting and managing a large number of third-party videoconferencing solutions. For example, the IWB must potentially manage a large number of third-party videoconferencing solutions, which increases the amount of computational resources required and can clutter the graphical user interface with controls for each third-party videoconferencing solution. In addition, the look and feel of the graphical user interfaces of the third-party videoconferencing solutions are different from each other, and from the look and feel of the native graphical user interface of the IWB. Also, "shallow integration" cannot even be used to manage enterprise client applications on top of mobile applications because of the complexity and user interface (UI) clutter created by enterprise client applications. Furthermore, users cannot communicate with each other via different videoconferencing solutions and user authentication must be separately performed by each videoconferencing solution.

SUMMARY

An apparatus comprises one or more processors, and one or more memories storing instructions which, when processed by the one or more processors, cause a management service to receive, from an application executing on an Interactive Whiteboard (IWB) appliance, a first request to perform a content collaboration function with respect to a first user on a first collaboration service and a second user on a second collaboration service. Both the first collaboration service and the second collaboration service are external to both the application executing on the IWB appliance and the apparatus. The management process determines whether the first collaboration service is the same as the second collaboration service. In response to determining that the first collaboration service is not the same as the second collaboration service, the management process generates, based upon the first request to perform a collaboration function with respect to a first user on a first collaboration service and a second user on a second collaboration service, a second request to perform the collaboration function with respect to the first user on the first collaboration service and the second user on the second collaboration service. The second request to perform the collaboration function with respect to the first user on the first collaboration service and the second user on the second collaboration service includes an authentication token that is specific to the first collaboration service or the second collaboration service, but not specific to either the first user or the second user. The management process causes the second request, that includes an authentication token that is specific to the first collaboration service or the second collaboration service, but not specific to either the first user or the second user, to perform the collaboration function with respect to the first user on the first collaboration service and the second user on the second collaboration service, to be transmitted to the first collaboration service or the second collaboration service. The approach may also be implemented by one or more non-transitory computer-readable media storing instructions which, when processed by one or more processors, causes the functionality to be performed. The approach may also be implemented by one or more computer-implemented methods.

BRIEF DESCRIPTION OF THE DRAWINGS

In the figures of the accompanying drawings like reference numerals refer to similar elements.

FIG. 1 is a block diagram that depicts an example arrangement for managing collaboration on Interactive Whiteboard (IWB) appliances.

FIG. 2G depicts an example contacts screen that is displayed by a OneLaunch application in response to a user selecting the "Contacts" option from the OneLaunch Panel.

FIG. 3 depicts a table that specifies example commands and corresponding arguments supported by a OneLaunch API.

FIG. 5 is a table that depicts example API data that specifies attributes of APIs of third-party collaboration services.

FIG. 6A depicts a license key table that stores license keys for Third-Party Collaboration Services 108.

FIG. 6B depicts a user subscription table that stores user subscription data for third-party collaboration services.

FIG. 6C depicts an authentication token table that stores authentication tokens that are used to authorize functions/operations involving different third-party collaboration services.

FIG. 6D is a Cross-License Authentication Token Table that stores cross-license authentication tokens that are used by OneLaunch Manager to support collaboration between users using different third-party collaboration services.

FIG. 6E depicts a User Status Table that stores user subscription data for Third-Party Collaboration Service.

FIG. 6F depicts a Meeting Status Table 650 that stores status information for collaboration meeting.

FIG. 8 is a message ladder diagram that depicts example interaction between various elements during a login procedure.

DETAILED DESCRIPTION

Figure 2A:
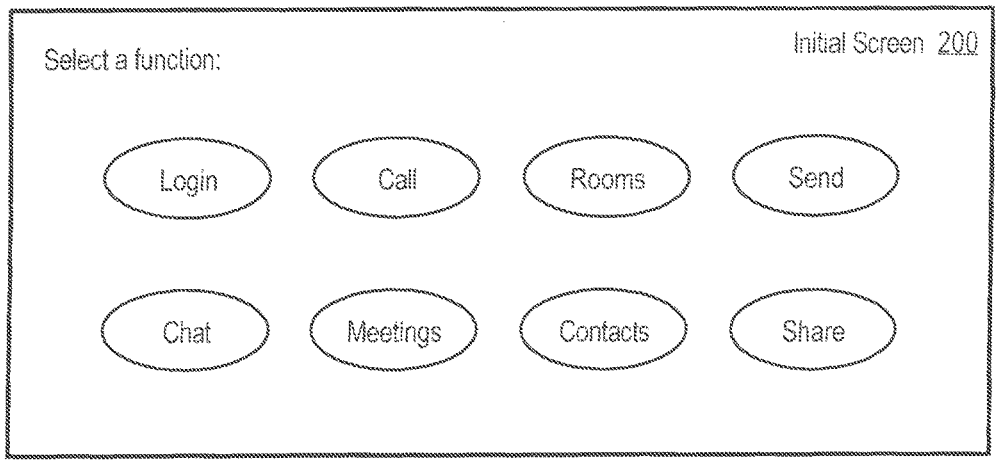
FIG. 2A depicts an initial screen, referred to herein as the "OneLaunch Panel", that is displayed upon invocation of a OneLaunch application.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:
I. Overview
II. Architecture
III. OneLaunch User Interface
  A. Login
  B. Call
  C. Rooms
  D. Send
  E. Chat
  F. Meetings
  G. Contacts
  H. Share
IV. API Management
V. License Key Management
VI. Cross-License Collaboration
VII. Operational Example
VIII. Implementation Examples I. Overview An approach for managing collaboration on IWBs allows users of different third-party collaboration services to participate in collaboration meetings on IWBs. The approach allows the users to use collaboration functionality provided by IWBs, such as annotation, and to communicate with each other, even though the users are using different third party collaboration services. The approach uses a collaboration manager that provides a "single wrapper" application program interface (API) and centralized management of collaboration meetings, including license key and token management, cross-license collaboration, user management and meeting management. The collaboration manager acts as a mediation layer that handles the APIs of different third-party collaboration services and allows users using heterogeneous collaboration clients to participate in collaboration meetings.

II. Architecture

FIG. 1 is a block diagram that depicts an example arrangement 100 for managing collaboration on IWBs. In the example depicted in FIG. 1, arrangement 100 includes client devices in the form of an IWB 102 and a Client Device 104, a OneLaunch Manager 106 and Third-Party Collaboration Services 108. These elements may be communicatively coupled via one or more wired or wireless network connections including, for example, the Internet, as well as one or more direct wired or wireless connections. Embodiments are not limited to the particular example arrangement 100 depicted in FIG. 1, and embodiments may include additional or fewer elements depending upon a particular implementation.

IWB 102 and Client Device 104 are each configured with a OneLaunch Application 110, 112, respectively, that provides access to Third-Party Collaboration Services 108 via OneLaunch Manager 106. Third-Party Collaboration Services 108 may be any type of collaboration services, for example, audio/video conferencing services, messaging services, chat services, desktop, application and data sharing services, etc.

IWB 102 includes one or more processors, one or more memories and a user interface. The user interface displays content to users and may be implemented by a touch screen that both displays information and accepts user input, for example, to select menu items, and annotate content displayed on IWB 102, etc. IWB 102 may include wired and wireless interfaces for communicating with other devices via one or more wired or wireless networks. According to one embodiment, IWB 102 is implemented as a stand-alone device. Client Device 104 may be implemented by any type of client device. Example implementations of Client Device 104 include, without limitation, a desktop computer, a laptop computer, a tablet computing device, a personal digital assistant (PDA), a mobile device, a smartphone, a multi-function peripheral (MFP), a scanning device, etc.

OneLaunch Applications 110, 112 are each a collaboration application that is configured to access OneLaunch Manager 106 via a OneLaunch application program interface (API) 120 that provides access to functionality and data provided by OneLaunch Manager 106. OneLaunch Applications 110, 112 may be implemented as so called "thin clients" that access any number Third-Party Collaboration Services 108 via OneLaunch API 120 of OneLaunch Manager 106, without having to implement the details of Third-Party Collaboration Services 108, such as the APIs. Thus, OneLaunch Applications 110, 112 provide client-side access to Third-Party Collaboration Services 108, without the need to install, on IWB 102 and Client Device 104, a separate client for each of the Third-Party Collaboration Services 108. The term "application" is used herein for explanation purposes only and OneLaunch Applications 110, 112 are not limited to stand-alone applications per se. OneLaunch Applications 110, 112 may each be implemented as a stand-alone process, a plug-in module, a widget, a library, etc. As another example, on IWB 102, OneLaunch Application 110 may be implemented as a GUI window. IWB 102 and Client Device 104 may be configured with other applications and processes that may vary depending upon a particular implementation. According to one embodiment, IWB 102 is configured with an annotation application that allows one or more users of IWB 102 to annotate electronic content, such as electronic documents, spreadsheets, email, audio/video content, etc., displayed on a user interface of IWB 102.

OneLaunch Manager 106, also referred to herein as a "management service," is one or more processes that implement Third-Party Collaboration Services 108 on behalf of IWB 102 and Client Device 104. In this manner, OneLaunch Manager 106 acts as a mediation layer between OneLaunch Applications 110, 112 and Third-Party Collaboration Services 108, and manages data and communications in a centralized manner. As described in more detail hereinafter, according to one embodiment, OneLaunch Manager 106 uses so called "deep integration" by implementing software development kits (SDKs), APIs and libraries for Third-Party Collaboration Services 108. Deep integration provides more granular control of Third-Party Collaboration Services 108 for managing users, features and the overall end-to-end user experience, and also reduces UI clutter on OneLaunch Applications 110, 112. OneLaunch Manager 106 also provides cross-license collaboration, which involves central management of license keys to allow a large and disparate set of users to be connected across a disparate set of third-party collaboration services.

OneLaunch Manager 106 may be implemented in computer software, computer hardware, or any combination of computer software and computer hardware. OneLaunch Manager 106 may be implemented as a stand-alone process, a plug-in, a library, etc., that is invoked by IWB 102 and Client Device 104. Some embodiments are described herein in the context of OneLaunch Manager 106 as a single process for purposes of explanation, but embodiments are not limited to this example implementation. OneLaunch Manager 106 may execute on one or more computing devices or network elements, including IWB 102 and Client Device 104.

As depicted in FIG. 1, OneLaunch Manager 106 includes OneLaunch API 120 that is used by OneLaunch Applications 110, 112. OneLaunch Manager 106 also includes a server 122, that receives requests from OneLaunch Applications 110, 112 that confirm to OneLaunch API 120 and routes the requests to Management Processes 130. Server 122 may also perform other functions, such as accessing data 150, performing data conversions, etc. For example, server 122 may perform data conversion between a data format supported by OneLaunch API 120 and data formats supported by third-party collaboration services 108. Management Processes 130 include an API Manager 132, a User Manager 134, an Identity Manager 136, a Meeting Manager 138, a License Manager 140 and a Presence Manager 142. These management processes are depicted in FIG. 1 as separate processes for explanation purposes only and the functionality provided by these managers may be organized and implemented in any number of processes that may vary depending upon a particular implementation. API Manager 132 generates requests that satisfy API requirements of third-party collaboration services. User Manager 134 maintains various types of data pertaining to users stored in User Data 154. Identity Manager 136 manages authentication tokens and cross-license authentication tokens. Meeting Manager 138 manages collaboration meetings and maintains Meeting Data 158. License Manager 140 manages license keys for third-party collaboration services. Presence Manager 142 manages user status data that may be maintained as part of User Data 154.

OneLaunch Manager 106 also includes an administrator 145 for managing various types of data 150 that includes API Data 152, User Data 154, authentication (auth) data 156, meeting data 158, License Data 160 and presence data 162. One or more portions of this data may be generated and managed by a user, such as an administrator, of OneLaunch Manager 106. User Data 154 may specify one or more Third-Party Collaboration Services 108 that correspond to each of a plurality of users. For example, User Data 154 may specify that a first user is a user of a Third-Party Collaboration Services 108 provided by a particular vendor. User Data 154 may also specify contacts for each user.

III. OneLaunch User Interface

According to one embodiment, the OneLaunch Applications 110, 112 implement a common graphical user interface for accessing Third-Party Collaboration Services 108 via OneLaunch Manager 106. The common graphical user interface may be implemented in a wide variety of ways that may vary depending upon a particular implementation. For example, the common graphical user interface may be implemented as an application-based user interface, as a Web-based user interface, or as a pluggable architecture which can be plugged into any application or system, etc. This provides a more favorable user experience by providing a common graphical user interface with a common "look and feel" across multiple third-party collaboration services. For example, the location and arrangement of windows and controls, as well as colors and other visual effects, is the same, regardless of the third-party collaboration service being used. Furthermore, the "look and feel" of the common graphical user interface may be tailored for particular implementations, for example using so called "skins," to provide a particular "look and feel" across a plurality of client devices within an organization. The "look and feel" and functionality of the various graphical user interface screens depicted and discussed hereinafter may be changed based upon a particular third-party collaboration service selected by a user during the login process, as described in more detail hereinafter with respect to FIG. 2B. This may include, for example, displaying different windows, controls, etc., based upon the logic for different third-party collaboration services.

FIG. 2A depicts an initial screen, referred to herein as the "OneLaunch Panel" 200, that is displayed upon invocation of OneLaunch Applications 110, 112. OneLaunch Panel 200 provides controls for accessing various collaboration functionality provided by Third-Party Collaboration Services 108. According to on embodiment, these controls are common across any third-party collaboration service being used in IWB appliance 102, and hence the OneLaunch Panel 200 acts as the one point of interface to any collaboration service. In the example depicted in FIG. 2A, the controls include a "Login" control to log into the OneLaunch service, a "Call" control to initiate a voice/video call, a "Rooms" control to access and manage rooms, a "Send" control to send electronic information to other users or meeting participants, a "Chat" control to initiate a chat session, a "Meetings" control to view and join ongoing meetings, a "Contacts" control to access contacts, and a "Share" control to share electronic information with participants of a meeting. These functions are commonly implemented on IWB appliances, but embodiments are not limited to these examples, and the approach described herein is applicable to any type of function that may be implemented on an IWB appliance. Each of these functions is described in more detail hereinafter. The particular options that are offered and/or enabled on OneLaunch Panel 200 may vary, depending upon the services offered by each Third-Party Collaboration Services 108. For example, the "Chat" control may be disabled when a user logs into a particular Third-Party Collaboration Services 108 that does not offer a chat service.

A. Login

Figure 2B:
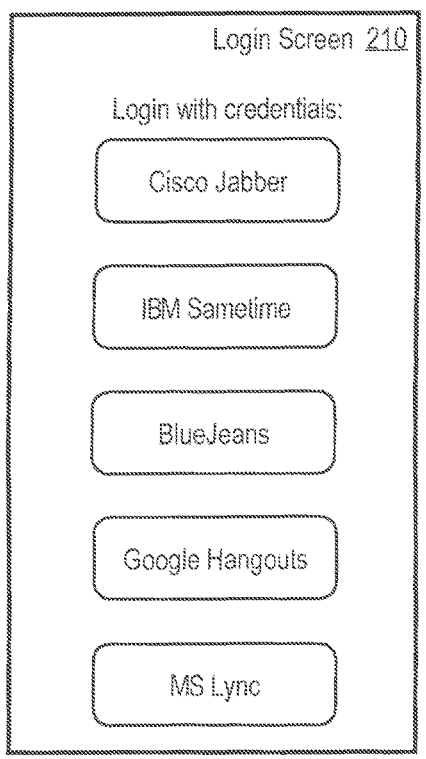
FIG. 2B depicts a login screen that is displayed by a OneLaunch application in response to a user selecting the "Login" option from the OneLaunch Panel.
Figure 2C:
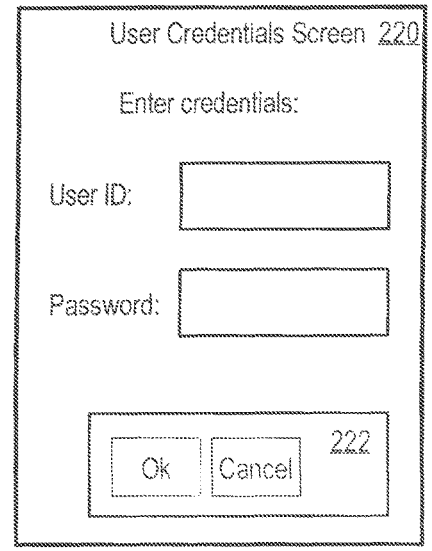
FIG. 2C depicts a user credentials screen that allows a user to enter user credentials in the form of a user ID and password for a selected third-party collaboration service.

The login function allows a user to log into the OneLaunch service. FIG. 2B depicts a login screen 210 that is displayed by OneLaunch Applications 110, 112 in response to a user selecting the "Login" option from OneLaunch Panel 200. Login screen 210 allows a user to login into any third-party collaboration service for which the user is registered. FIG. 2C depicts a user credentials screen 220 that allows a user to enter user credentials, in the form of a user ID and password, for a selected third-party collaboration service. User credentials screen 220 is provided as one example and other user credentials may be queried from a user, depending upon the requirements of a particular third-party collaboration service. Controls 222, allow a user to confirm the entered user credentials, or cancel and return to the OneLaunch Panel 200 of FIG. 2A. According to one embodiment, if a user does not have an account with any of the third-party collaboration services, the user may login using an identity provider, such as a social network service, e.g., Google+, Facebook, etc. For example, Controls 222 may include an option which when selected allows a user to log into an identity provider by supplying their login credentials for a selected identity provider.

Once the user credentials are entered and confirmed, OneLaunch Application 110, 112 passes the user credentials to OneLaunch Manager 106 via OneLaunch API 120, along with other information such as data that identifies the particular third-party collaboration service to be used, and optionally other information, such as machine parameters. OneLaunch Manager 106 in turn provides the user credentials to the selected third-party collaboration service for user authentication, using the API of the selected third-party collaboration service. Once the user is authenticated with the third-party collaboration service, OneLaunch Manager 106 updates Authentication Data 156. There may be situations where a user has been previously authenticated and the previous authentication is still valid. In this situation, the user does not need to be reauthenticated with the third party collaboration service and OneLaunch Manager 106 can use Authentication Data 156 to log the user into the third-party collaboration service. Alternatively, OneLaunch Manager 106 may send a request to the selected third-party collaboration service to request the authentication data that is required, and then inform OneLaunch Application 110, 112 so that this information can be queried from the user. After a successful user authentication, a contacts screen may be displayed, as described in more detail hereinafter. Alternatively, a user may be returned to the OneLaunch Panel 200.

B. Call

Figure 2D:
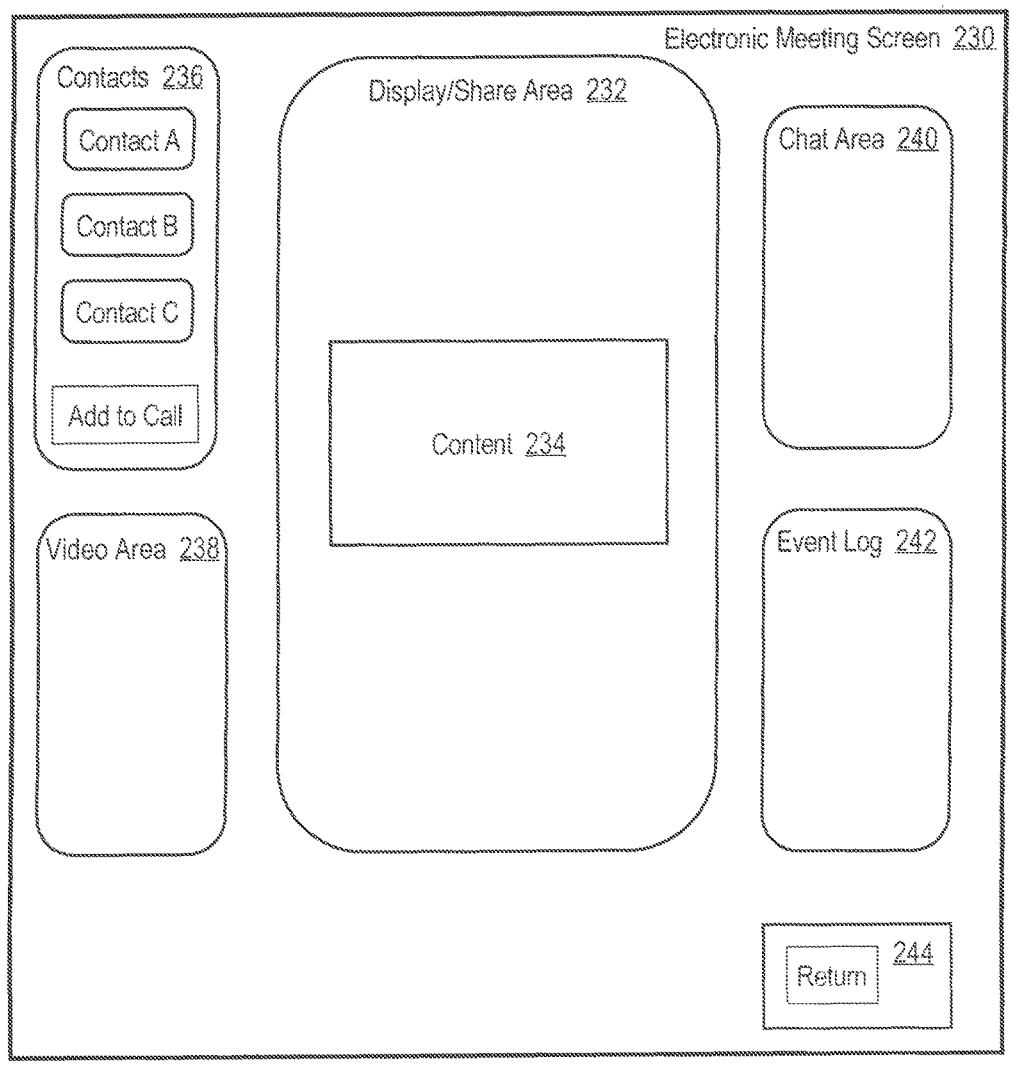
FIG. 2D depicts an example electronic meeting screen that is displayed by a OneLaunch application in response to a user, who is currently logged in, selecting the "Call" option from the OneLaunch Panel.

The call function allows a user to initiate a voice/video call with one or more other users. FIG. 2D depicts an example electronic meeting screen 230 that is displayed by OneLaunch Applications 110, 112 in response to a user, who is currently logged in, selecting the "Call" option from OneLaunch Panel 200. Selection of the "Call" option by a user who is not logged in causes the login screen 210 to be displayed.

Electronic meeting screen 230 includes a display/share area 232 for displaying and sharing electronic information and content 234, such as electronic documents, audio/video information, desktop and screen content, etc. Electronic meeting screen 230 also includes a set of contacts 236, from which participants for the call may be selected, or that have already been selected. Thus, contacts 236 may include candidate participants, current participants, or both candidate participants and current participants for a call, and participants may be added at any time during a call. A user may select a particular contact from contacts 236 and select a "Add to Call" control to add the selected contact to the call. Additional information, for example in the form of a visual indication, may be provided to indicate the status of each of the contacts 236. The currently-logged in user may be designated as the meeting host or organizer.

Electronic meeting screen 230 also includes a video area 238 for displaying video content and/or a video conferencing window, a chat area 240 for conducting an electronic chat session, and an event log 242 that displays an event history. A "Return" control 244 allows a user to return to the OneLaunch Panel 200 of FIG. 2A. Embodiments are not limited to the example electronic meeting screen 230 depicted in FIG. 2D and the particular arrangement, sequence and content of electronic meeting screen 230 may vary depending upon a particular implementation.

C. Rooms

Figure 2E:
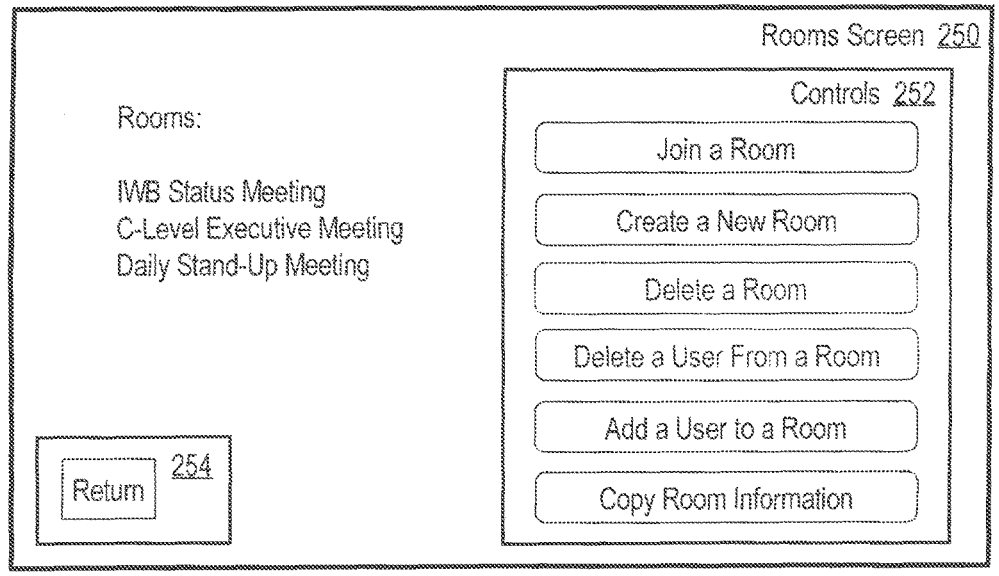
FIG. 2E depicts a rooms screen that is displayed by a OneLaunch application in response to a user selecting the "Rooms" option from the OneLaunch Panel.

The Rooms control allows a user to access and manage rooms. As used herein, the term "room" refers to a private meeting between two or more participants. Rooms may not be known or visible to the public, and may only be known to the participants. Rooms may require user authentication, while meetings may not require user authentication. FIG. 2E depicts a rooms screen 250 that is displayed by OneLaunch Applications 110, 112 in response to a user selecting the "Rooms" option from OneLaunch Panel 200. Rooms screen 250 displays a set of current rooms. A user may select a room from rooms screen 250 to join the selected room. The user is allowed to join the selected room if the user has the credentials or authorization necessary to join the room.

Otherwise, a request for the user to join the room is transmitted to the organizer of the selected room. If the organizer of the selected room grants the request, then the user is granted access to the selected room. In some implementations, rooms may be specific to a particular third-party collaboration service and may not be enabled for all third-party collaboration services. According to one embodiment, the "Rooms" option in the OneLaunch Panel 200 is enabled only when a user is logged into a third-party collaboration service that supports a rooms service.

Rooms screen 250 includes controls 252 that, in the present example, allow a user to perform various functionality with respect to rooms and users. This includes joining a room, creating a new room, deleting an existing room, deleting a user from an existing room, adding a user to an existing room, or copying room information. For example, after selecting a particular room from rooms screen 250 using, for example, a pointing device such as a mouse, a user may select the "Join a Room" control 252 to join the selected room, select the "Delete a Room" control to delete the selected room, select the "Delete a User From a Room" control 252 to delete a user from the selected room, select the "Add a User to a Room" to add a user to the selected room, or select the "Copy Room Information" control 252 to copy room information from the selected room. In response to selecting the "Delete a User From a Room" control 252, the user is presented with a list of current users of the selected room and the user may select one or more of the current users to be deleted from the room. In response to selecting the "Add a User to a Room" control 252, the user is presented with a list of users, from contacts, and the user may select one or more users to be added to the selected room. In response to selecting the "Create a New Room" control 252, the a dialog box is displayed that allows the user to specify attributes of the new room, such as a name, permissions, etc. The copying room information function allows content shared in a room to be copied to another room, for example, via a URL. A "Return" control 254 allows a user to return to the OneLaunch Panel 200 of FIG. 2A.

D. Send

The send function allows a user to send electronic information, such as an electronic document or other content, to one or more other users and/or meeting participants. In response to a user selecting the "Send" option from OneLaunch Panel 200, a navigation window may be displayed that allows the user to select electronic information to be sent. Once the electronic information to be sent has been selected, the user may select one or more recipients from contacts and/or meeting lists. To send electronic information to meeting participants, the user must be logged in and be in the meeting.

E. Chat

The chat function allows a user to chat with one or more other participants in a meeting. For example, after logging in and being presented with the electronic meeting screen 230, a user may select the chat area 240 to access a set of controls pertaining to chat sessions. The controls may allow the user to join an existing chat, or create a new chat with one or more participants in the meeting. The users may include selected users in a meeting, all users in a meeting, or users from particular Third-Party Collaboration Services 108. For example, the user may select, for inclusion in a new chat, one or more IBM Sametime users, or users from a specific collaboration service (to enable chatting with Cisco Jabber users only).

F. Meetings

Figure 2F:
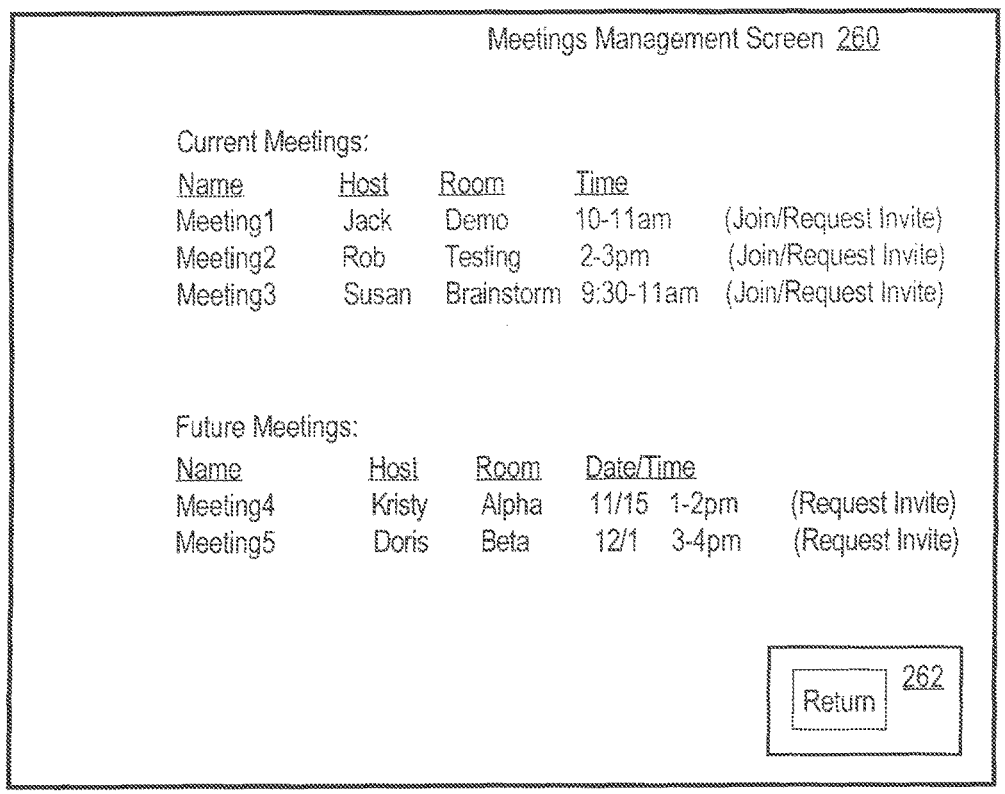
FIG. 2F depicts an example meetings management screen that is displayed by a OneLaunch application in response to a user selecting the "Meetings" option from the OneLaunch Panel.

The meetings function allows a user to access current and future meetings. FIG. 2F depicts an example meetings management screen 260 that is displayed by OneLaunch Applications 110, 112 in response to a user selecting the "Meetings" option from OneLaunch Panel 200. Meetings management screen 260 displays current electronic meetings being conducted and information for each electronic meeting, including a meeting name, a meeting host, a room and time. Meetings may be public or private and the public or private status of a meeting may be visually indicated on meetings management screen 260. A Join/Request Invite (invitation) control allows a user to join or request an invitation to an electronic meeting. Selecting the Join/Request Invite control allows a user who has already been invited/authorized to join an electronic meeting. Joining an electronic meeting may cause the electronic meeting screen 230 (FIG. 2D) to be displayed for the selected electronic meeting, as previously described herein with respect to the "Call" option. For a user that has not yet been invited/authorized to join an electronic meeting, selecting the Join/Request Invite control causes a request to be sent to the meeting organizer or host. An indication may be provided when the meeting organizer or host decides whether to accept the request.

Meetings management screen 260 also displays future electronic meetings and information for each future electronic meeting, including a meeting name, a meeting host, a room and date and time. A Request Invite (invitation) control allows a user to request an invitation to a future electronic meeting. Selecting the Request Invite control causes a request to be sent to the meeting organizer or host. A "Return" control 262 allows a user to return to the OneLaunch Panel 200 of FIG. 2A.

G. Contacts

The contacts function allows a user to view contacts and their status. FIG. 2G depicts an example contacts screen 270 that is displayed by OneLaunch Applications 110, 112 in response to a user selecting the "Contacts" option from OneLaunch Panel 200. Contacts screen 270 shows a list of contacts and a current status for each contact. According to one embodiment, contacts are maintained by OneLaunch Manager 106 as part of User Data 154. Contacts may be generated and managed via the User Manager 134. This provides the benefit of allowing a user to view contacts across multiple Third-Party Collaboration Services 108. In the example depicted in FIG. 2G, the current status is visually indicated by different symbols, but this is just one example, and status may be visually indicated in a wide variety of ways that may vary depending upon a particular implementation. For example, a current status may be visually indicated using colors, shading, special visual effects, etc. According to one embodiment, a current status may include online and available, online and in a meeting, online and away, online and do not disturb, offline and unavailable, and a custom status that may be specified, for example, by a user. Embodiments are not limited to these particular statuses and other statuses may be used. A views control 272 allows a user to select a view from a list of available views. Views provide a way to filter contacts, which may be useful in situations where a user has a large number of contacts. Example views include, without limitation, contacts with a particular status such as online contacts, contacts in a particular meeting, and contacts that are registered with a particular Third-Party Collaboration Services 108, such as Google Hangouts, MS Lync, IBM Sametime, etc. A "Return" control 274 allows a user to return to the OneLaunch Panel 200 of FIG. 2A.

H. Share

Figure 2H:
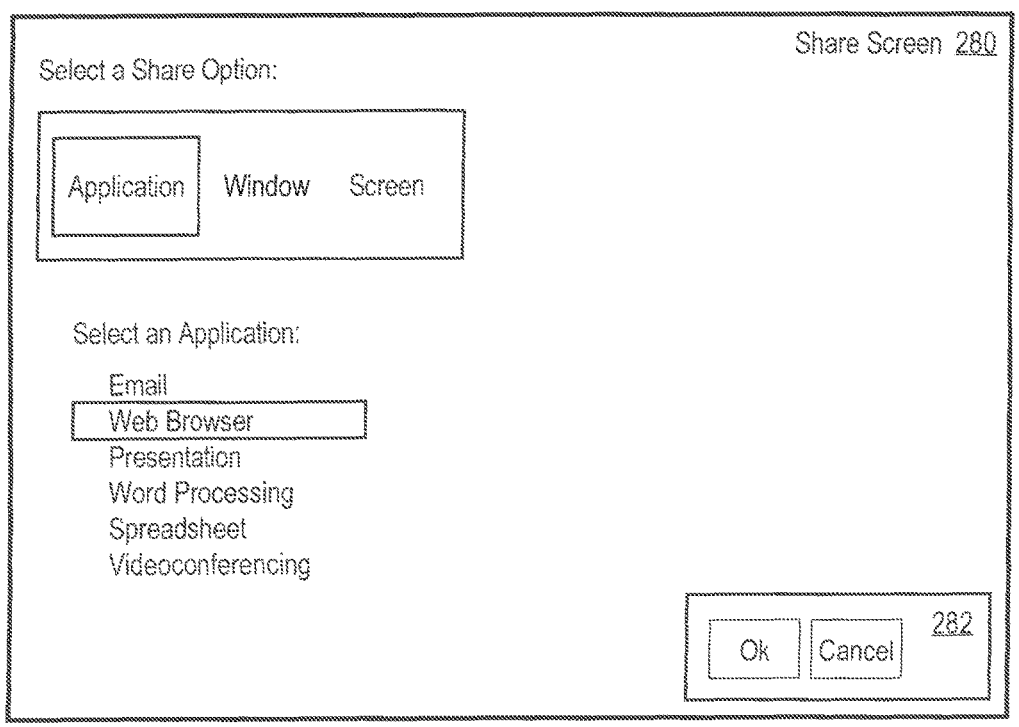
FIG. 2H depicts an example share screen that is displayed by a OneLaunch application in response to a user selecting the "Share" option from the OneLaunch Panel.

The share function allows a user to share artifacts, documents, screens, or any other electronic information with other users in an electronic meeting. FIG. 2H depicts an example share screen 280 that is displayed by OneLaunch Applications 110, 112 in response to a user selecting the "Share" option from OneLaunch Panel 200. Share screen 280 allows a user to select a share option, where each share option corresponds to a type of electronic information to be shared. In the example depicted in FIG. 2H, the options include application, window, and screen. Embodiments are not limited to this example and may allow for sharing of other types of electronic information. In the example depicted in FIG. 2H, the user has selected to share an application with other users in a meeting and in response to this selection, a list of applications that may be shared is displayed. The user has selected to share their Web browser and controls 282 allow the user to confirm or cancel this selection. Once an item has been confirmed for sharing, the user is provide the option of selecting a particular electronic meeting in which the selected information is to be shared. For example, a list of current electronic meetings may be displayed with controls for selecting a particular electronic meeting. A control may also be provided to stop sharing.

IV. API Management

OneLaunch Manager 106 uses "deep integration" to provide a single wrapper OneLaunch API 120 that allows OneLaunch Applications 110, 112 to access the services provided by Third-Party Collaboration Services 108 without having to be aware of, or implement, the details of the APIs of Third-Party Collaboration Services 108. According to one embodiment, API Manager 132 provides this functionality by providing unified API calls for accessing Third-Party Collaboration Services 108, data conversion, and version management. OneLaunch Manager 106 processes requests that conform to OneLaunch API 120 and provides, to Third-Party Collaboration Services 108, requests that conform to the APIs of Third-Party Collaboration Services 108. This may be accomplished using a wide variety of processing that may vary depending upon a particular implementation. For example, API Manager 132 may forward requests received from OneLaunch Applications 110, 112 to Third-Party Collaboration Services 108 with minimal or no processing. This may occur, for example, in situations where a request that conforms to OneLaunch API 120 satisfies the requirements of an API of Third-Party Collaboration Services 108 with minimal or no processing. Alternatively, API Manager 132 may perform various types of processing to generate requests that satisfy the requirements of the APIs of Third-Party Collaboration Services 108. For example, API Manager 132 may examine and extract data, such as commands, parameters, arguments, values, etc., from a request that satisfies the requirements of OneLaunch API 120, and then generate a request that satisfies the requirements of the APIs for Third-Party Collaboration Services 108 and includes part or all of the data extracted from the request that satisfies the requirements of the OneLaunch API 120. This may include transforming or translating one or more portions of the data extracted from the request that satisfies the requirements of the OneLaunch API 120. API Manager 132 may perform other functionality, such as managing API keys and URLs. The generating of calls that satisfy the requirements of the APIs of Third-Party Collaboration Services 108 may be accomplished by logic implemented by API Manager 132.

The particular functionality supported by OneLaunch API 120 may vary depending upon a particular implementation, and embodiments are not limited to any particular implementation. FIG. 3 depicts a Table 300 that specifies example commands and corresponding arguments supported by One-Launch API 120. As depicted in FIG. 3, the commands relate generally to performing content collaboration functions with respect to electronic meetings, audio/video calls, and content sharing. Embodiments are not limited to these contexts and are applicable to other contexts. In addition, fewer or additional commands may be supported, depending upon a particular implementation, and embodiments are not limited to OneLaunch API 120 supporting the example commands depicted in FIG. 3. The contents of Table 300 may be stored, for example, in API Data 152, as non-structured or structured data, in any format.

Figure 4A:
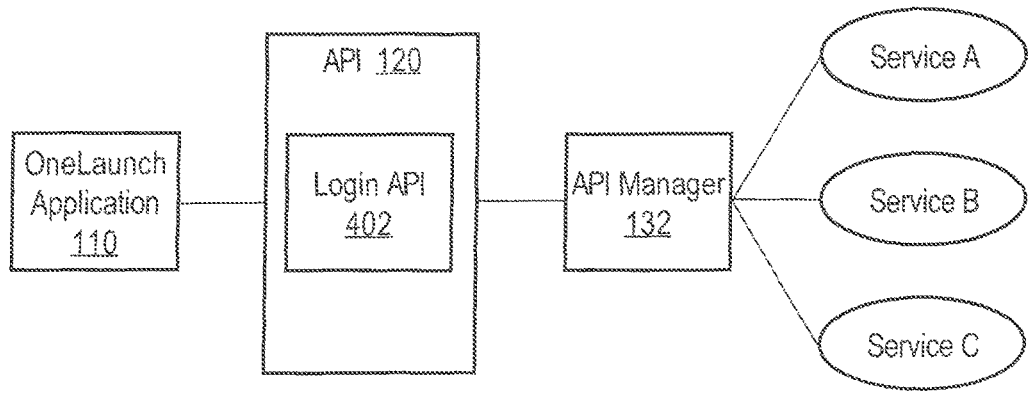
FIG. 4A depicts an arrangement in which a OneLaunch API and a API Manager of a OneLaunch Manager provide unified API calls for third-party collaboration services.

FIG. 4A depicts an arrangement 400 in which OneLaunch API 120 and API Manager 132 of OneLaunch Manager 106 provide unified API calls for Third-Party Collaboration Services 108. In the example depicts in FIG. 4A, Third-Party Collaboration Services 108 include Service A, Service B, and Service C. OneLaunch API 120 defines the commands, data, parameters, arguments, and any other information needed by API Manager 132 to generate calls that satisfy the requirements of the APIs for Third-Party Collaboration Services 108.

In the example depicted in FIG. 4A, OneLaunch Application 110 generates a login request that conforms to a Login API 402 of OneLaunch API 120. The login request specifies a particular Third-Party Collaboration Services 108 to be accessed, along with user credentials required by the particular Third-Party Collaboration Services 108. In the present example, it is presumed that the request specifies Webex, and user credentials in the form of a user ID ("JackD") and password ("doghouse"). For example, the login request may take the form of "Login/service=webex&user=JackD&password=doghouse." The login request is received by OneLaunch Manager 106 and routed by server 122 to API Manager 132. Server 122 may perform processing based upon the request, for example, accessing data 150 and implementing various logic and decision making. Although not specifically depicted in FIGS. 4A-4D, requests received by OneLaunch Manager 106 are initially processed by server 122 and routed to one of the Management Processes 130 for processing.

In the present example, API Manager 132 receives and processes the login request to generate a processed request, or a new request, that conforms to the API of Service A. According to one embodiment, API Manager 132 use API Data 152 to generate the processed request, or the new request. API Data 152 includes data that describes the API of each Third-Party Collaboration Services 108, i.e., defines one or more attributes of the API of each third-party collaboration service.

FIG. 5 is a Table 500 that depicts example API data that specifies attributes of APIs of Third-Party Collaboration Services 108. In this example, Table 500 specifies a service provider, a service, a function, data that describes the API, which may be in the form of a link to data that describes the API, a protocol or format supported by the API, a version, status, whether a particular version is the default version of the API, and comments that may indicate, for example, whether a particular version is the preferred version. For example, the first row of Table 500 specifies API data for performing a "Login" function for the "Webex" service provided by Cisco. The API data includes data that specifies a URL address and arguments for performing the "Login" function. The first row also specifies the format as "REST," the version of the API data as "2.0," the status as "Active,"

whether the particular version of the API is the default version, and no comments indicating that Version 2.0 is the preferred version. Referring to the prior example, API Manager 132 extracts the service name, user ID and password from the received request and generates a request that satisfies the requirements of the Cisco Webex API. For example, the request may be "https://server.cisco.com/Login/user=JackD&password=doghouse." As another example, the request may be "https://server.cisco.com/Login/authentication=SomeAuthenticationToken" if the user was recently logged in and the authentication token is available in Authentication Token Table 620, which is described in more detail hereinafter.

According to one embodiment, API versions that are designated as default or preferred are used when a request does not specify a version of an API to use. API Versions not indicated as "preferred" or as the default version may be used in situations where a request specifies a particular version of an API for one of the Third-Party Collaboration Services 108. For example, the API Data 152 for provider "ABC" includes three versions (V1, V3, V4) of the API for performing a "Login" function for the "Conference" service and version V1 is designated as the "preferred" version, even though versions V3 and V4 are later versions. A "Login" request for the "ABC-Conference" service received from OneLaunch Application 110, 112 may not specify a particular version of the API. In this situation, API Manager 132 determines, based upon API Data 152, that version V1 is the preferred version of the API for the "ABC-Conference" service and processes the request in a manner that ensures that the request provided to the particular third-party collaboration service satisfies the requirements of version V1 of the API. Alternatively, the request received from OneLaunch Application 110, 112 may specify V3 or V4 of the API for the "ABC-Conference" service and API Manager 132 processes the request in a manner that ensures that the request provided to the particular third-party collaboration service satisfies the requirements of the version of the particular API for the particular third-party collaboration service that was specified in the request. In this manner, API Manager 132 selects an appropriate API from Table 500 to minimize errors on the client and server side and allow the API to work seamlessly for the request made.

The contents of Table 500 may be generated and maintained by a user, such as an administrator, to ensure that the current version of APIs supported by Third-Party Collaboration Services 108 are represented in Table 500. Thus, API Manager 132 ensures, using API Data 152, that the processed request, or new request, properly conforms to the current supported version of the API for Service A. API Manager 132 then forwards the processed login request to Service A. According to one embodiment, the contents of Table 500 are regularly maintained with the latest API data to avoid APIs from becoming obsolete and to prevent errors.

Once received from OneLaunch Manager 106, the specified service processes the login request and provides, to API Manager 132, a response that conforms to the API of the specified service. API Manager 132 processes the response, generates a processed response that conforms to OneLaunch API 120, and forwards the processed response to the entity that sent the original request, which in the present example is OneLaunch Application 110. In this manner, OneLaunch Manager 106 provides a unified single wrapper API for OneLaunch Applications 110, 112 and handles the flow and processing of requests and responses between OneLaunch Applications 110, 112 and Third-Party Collaboration Services 108.

Figure 4B:
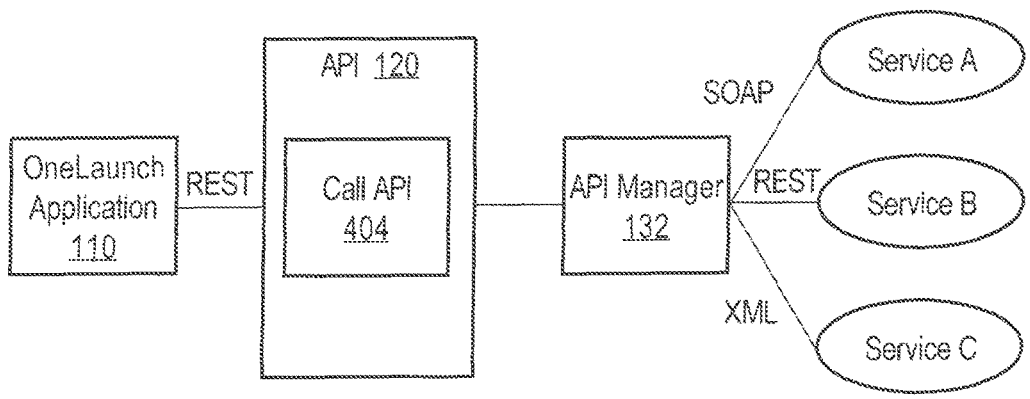
FIG. 4B depicts an arrangement in which OneLaunch API and API Manager of OneLaunch Manager provide data conversion services between one or more data protocols and formats supported by OneLaunch API and data protocols and formats required by third-party collaboration services.

According to one embodiment, API Manager 132 includes the capability to handle different data protocols, languages and/or data formats. This allows OneLaunch Applications 110, 112 to support only the data protocol and format supported by OneLaunch API 120, without having to support data protocols and formats required by Third-Party Collaboration Services 108. FIG. 4B depicts arrangement 400 in which OneLaunch API 120 and API Manager 132 of OneLaunch Manager 106 provide data conversion services between one or more data protocols and formats supported by OneLaunch API 120 and data protocols and formats required by Third-Party Collaboration Services 108.

In the example depicted in FIG. 4B, OneLaunch API 120 of OneLaunch Manager 106 supports Representational State Transfer (REST), while Service A supports Simple Object Access Protocol (SOAP), Service B supports REST and Service C supports Extensible Markup Language (XML). API Manager 132 is configured to convert requests from REST to SOAP, REST, or XML, depending upon the target Third-Party Collaboration Services 108. API Manager 132 is also configured to convert responses from SOAP, REST, or XML to REST. In this manner, OneLaunch Manager 106 provides data protocol and data format conversion services on behalf of OneLaunch Applications 110, 112, so that OneLaunch Applications 110, 112 do not need to support the data protocols and data formats required by Third-Party Collaboration Services 108. This allows a large number of disparate third-party collaboration services to be connected, irrespective of the data formats and protocols they support.

Figure 4C:
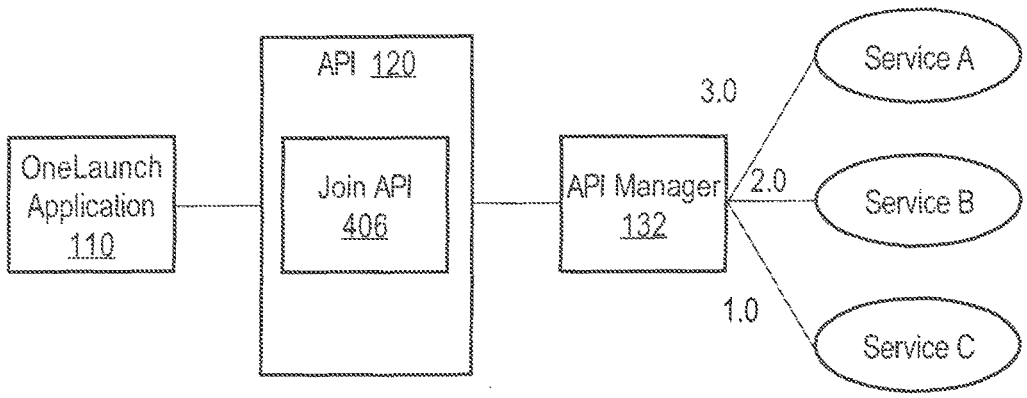
FIG. 4C depicts arrangement in which third-party collaboration services support multiple versions of APIs, and an API Manager determines an appropriate version of API to be used for each third-party collaboration service.

In some situations, Third-Party Collaboration Services 108 support multiple versions of an API. According to one embodiment, API Manager 132 includes the capability to select an appropriate version of an API for Third-Party Collaboration Services 108 and then perform conversion services that are consistent with that version of the API. FIG. 4C depicts arrangement 400 in which Third-Party Collaboration Services 108 support multiple versions of APIs, and API Manager 132 determines an appropriate version of API to be used for each Third-Party Collaboration Services 108. In the example depicted in FIG. 4C, API Manager 132 determines that version 3.0 of the API should be used for Service A, version 2.0 of the API should be used of for Service B, and version 1.0 of the API should be used for Service C.

Figure 4D:
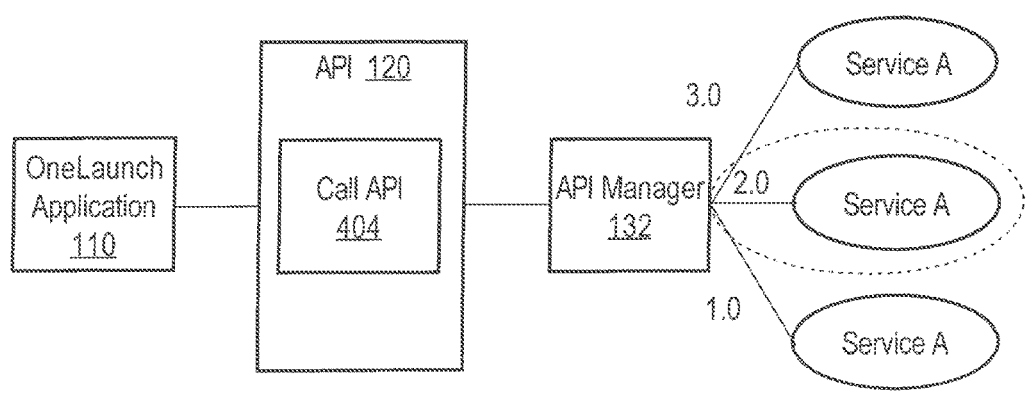
FIG. 4D depicts arrangement in which Service B supports three versions of an API, including versions 1.0, 2.0 and 3.0.

FIG. 4D depicts arrangement 400 in which Service B supports three versions of an API, including versions 1.0, 2.0 and 3.0. As indicated in FIG. 4D, API Manager 132 has determined that version 2.0 is the appropriate version of API to be used for Service B. The preferred version of the API for Third-Party Collaboration Services 108 may be specified by API Data 152, which may be configured, for example, by an administrator. According to one embodiment, API Manager 132 is configured to provide error handling services. This may include, for example, determining that there is no API support, or obsolete API support, for target Third-Party Collaboration Services 108. For example, OneLaunch Manager 106 may receive a request from OneLaunch Application 110 to initiate a chat service using Service A. During processing of the request, API Manager 132 determines that there is no API support, or inadequate API support, for Service A. In response to making this determination, API Manager 132 generates and transmits an error message to OneLaunch Application 110 indicating that there is no API support, or inadequate API support, for Service A.

V. License Key Management

It is not uncommon for third-party content collaboration services to require users to be authorized to use their services. Authorization may be provided by a wide variety of mechanisms that may vary depending upon a particular implementation. As one example, third-party collaboration services may require the use of license keys to ensure that a user that corresponds to a request is authorized to use the service. For example, a user might be required to be authorized under a valid license key to use a particular third-party collaboration service. According to one embodiment, OneLaunch Manager 106 manages various types of license data, user subscription data, user status data, and meeting data to support collaboration via Third-Party Collaboration Services 108 that require users to be currently licensed.

FIG. 6A depicts a License Key Table 600 that stores license keys for Third-Party Collaboration Services 108. Each row of License Key Table 600 corresponds to a license key issued to an organization, such as a business organization, and specifies a service provider, a service, a name of the organization, a license key, a number of users within the organization that are authorized to use the license key, an expiration date of the license key, a status of the license key, and comments pertaining to the license key. In the example depicted in FIG. 6A, all of the data is for the organization "XYZ" and three different services, but in practice License Key Table 600 may include data for any number of organizations and services. License Key Table 600 may be created and maintained by a user, such as an administrator of OneLaunch Manager 106, and used by License Manager 140 to determine whether a request has a corresponding valid license key before issuing the request to a Third-Party Collaboration Services 108. License Key Table 600 may be maintained as part of License Data 160.

FIG. 6B depicts a User Subscription Table 610 that stores user subscription data for Third-Party Collaboration Services 108. Each row of User Subscription Table 610 corresponds to a user and specifies a service provider, a service, a name of the organization, a user ID for the user, a contact number for the user, a current subscription status ("Sub Status"), and comments. A contact number is used for explanation purposes only, and other types of contact information may be used, depending upon a particular implementation. In the example depicted in FIG. 6B, all of the data is for the organization "XYZ" and three different services and three users, but in practice User Subscription Table 610 may include data for any number of organizations, services and users. User Subscription Table 610 may be created and maintained by a user, such as an administrator of OneLaunch Manager 106, and used by User Manager 134 to determine whether a user is current subscribed to a particular third-party collaboration service. This information may be used for many different purposes, for example, to indicate to a user the other users that are currently logged into a particular Third-Party Collaboration Services 108. User Subscription Table 610 may be maintained as part of User Data 154.

FIG. 6C depicts an Authentication Token Table 620 that stores authentication tokens that are used to authorize functions/operations involving different Third-Party Collaboration Services 108. Each row of Authentication Token Table 620 corresponds to a user and specifies a service provider, a service, a name of the organization, a user ID, an authentication token, a token status, a number of days to expiration ("Expiry in"), a presence or status of the user, and comments. In the example depicted in FIG. 6C, all of the data is for the organization "XYZ" and three different services and three different users, but in practice Authentication Token Table 620 may include data for any number of organizations, services and users. Authentication tokens may be manually specified by a user, for example, by an administrator of OneLaunch Manager 106. This may be done in situations, for example, where user credentials are separately registered with the particular Third-Party Collaboration Services 108. In these situations, the registration tokens issued by the Third-Party Collaboration Services 108 upon completion of registration may be manually entered into Authentication Data 156. Alternatively, authentication tokens may be issued on a per-user basis by a Third-Party Collaboration Services 108 after a user logs into the Third-Party Collaboration Services 108 via OneLaunch Manager 106. For example, Identify Manager 138 may extract authentication tokens from Login responses received from Third-Party Collaboration Services 108. Authentication tokens have a limited lifespan and eventually expire, based upon the particular Third-Party Collaboration Services 108 (or as manually specified by an administrative user), and must be replaced. Authentication Token Table 620 may be created and maintained by a user in Authentication Data 156, such as an administrator of OneLaunch Manager 106, and is used by Identity Manager 136 to manage functions/operations involving different Third-Party Collaboration Services 108. The number of authentication tokens for a particular Third-Party Collaboration Services 108 is equal to the number of users authorized by the license key for the particular Third-Party Collaboration Services 108. Authentication Token Table 620 may be maintained as part of Authentication Data 156 by Identify Manager 136.

According to one embodiment, when OneLaunch Manager 106 receives a request, for example, a Login request for a particular user to access a particular third-party collaboration service from Third-Party Collaboration Services 108, License Manager 140 first verifies, based upon License Data 160, whether the user's organization has a current license key. If so, then License Manager 140 verifies, based upon User Data 154, whether the particular user has an active subscription to the particular third-party collaboration service. If so, then License Manager 140 retrieves, from Authentication Token Table 620, an authentication token for the particular user with respect to the particular third-party collaboration service. The retrieved authentication token is used by API Manager 132 to access the API of the particular third-party collaboration service.

VI. Cross-License Collaboration

Authentication tokens are normally specific to both a particular user and a particular third-party collaboration service. This means that normally a user must have an authentication token for each third-party collaboration service that the user wishes to use. For example, for a particular user to use both third-party collaboration services A and B, an authentication token must be available for the particular user with respect to service A, and a separate authentication token must be available for the particular user with respect to service B. Furthermore, users must use the same third-party collaboration services, meaning that a user of third-party collaboration service A cannot collaborate with a user of third-party collaboration service B. This greatly increases the number of authentication tokens that must be issued and maintained, and also increases the number of authorized users for license keys.

To address these issues, OneLaunch Manager 106 supports what is referred to herein as "cross-license collaboration," which allows users to collaborate electronically using different third-party collaboration services. For example, a user of service A, e.g., Cisco Jabber, is able to collaborate with a user of Service B, e.g., IBM Sametime. Furthermore, this is accomplished without requiring a user-specific authentication token for each third-party collaboration service. According to one embodiment, OneLaunch Manager 106 uses cross-license authentication tokens that are specific to a particular third-party collaboration service, but not to a particular user, and therefore may be used across multiple users. This allows users of different third-party collaboration services to collaborate with each other.

FIG. 6D is a Cross-License Authentication Token Table 630 that stores cross-license authentication tokens that are used by OneLaunch Manager 106 to support collaboration between users using different third-party collaboration services 108. Each row of Cross-License Authentication Token Table 630 corresponds to an organization, such as a business organization, and specifies a service provider, a service, a name of the organization, an authentication token, a token status, a number of days to expiration ("Expiry in"), and comments. In the example depicted in FIG. 6D, all of the data is for the organization "XYZ" and three different services, but in practice, Cross-License Authentication Token Table 630 may include data for any number of organizations and services. A user, such as an administrator, may establish the number of cross-license authentication tokens to be maintained for an organization, or other logical group.

The authentication tokens in Cross-License Authentication Table 630 may be specified manually, for example, by an administrative user of OneLaunch Manager 106. The authentication tokens may be obtained from Third-Party Collaboration Services 108 using general or generic user credentials, for example, of an administrative user of an organization.

The authentication token(s) are then manually entered into Cross-License Authentication Table 630. Authentication tokens in Cross-License Authentication Table 630 may be acquired for any number of logical entities with an organization. For example, authentication tokens may be acquired for divisions, departments, projects, teams, etc. Cross-License Authentication Token Table 630 may be maintained as part of Authentication Data 156 by Identify Manager 136. According to one embodiment, the number of users that can simultaneously use cross-license tokens is restricted by license key restrictions.

FIG. 6E depicts a User Status Table 640 that stores user subscription data for Third-Party Collaboration Services 108. Each row of table 610 corresponds to a user and specifies a service provider, a service, a name of the organization, a user ID for the user, a contact number for the user, a current status of the user, e.g., "Online," "Offline," "Busy", "Away," etc., and comments. As in the user subscription table 610 above, a contact number is used for explanation purposes only, and other types of contact information may be used, depending upon a particular implementation. In the example depicted in FIG. 6E, all of the data is for the organization "XYZ" and three different services and three users, but in practice user subscription table 610 may include data for any number of organizations, services and users. User Status Table 640 may be created and maintained by a user, such as an administrator of OneLaunch Manager 106. User Status Table 640 may be used by API Manager 132 to determine the service that a particular user is using. User Status Table 640 may be maintained as part of User Data 154.

FIG. 6F depicts a Meeting Status Table 650 that stores status information for collaboration meetings.

Figure 7B:
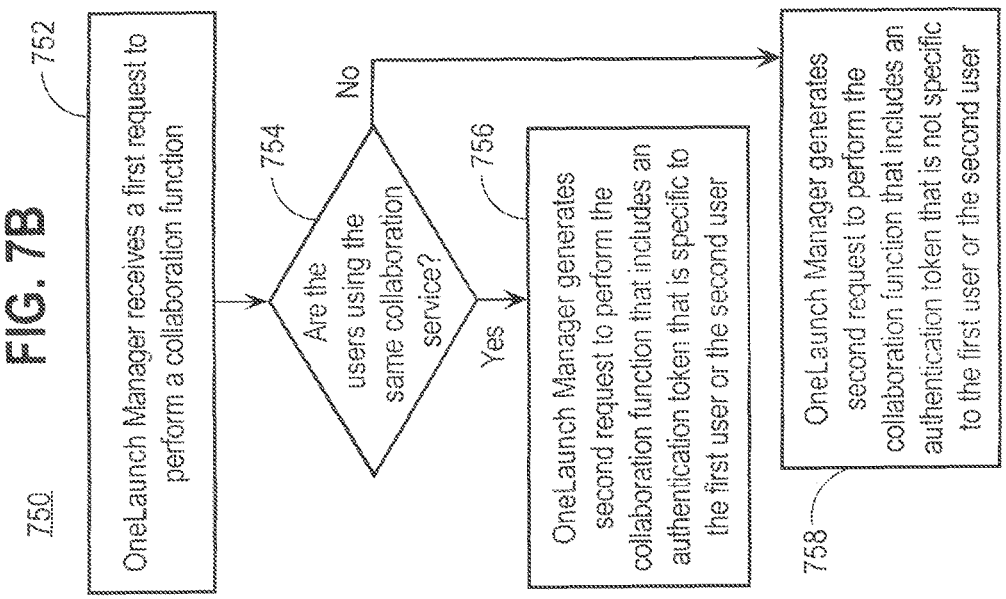
FIG. 7B is a flow diagram that depicts an approach for using cross-license authentication tokens.
Figure 7A:
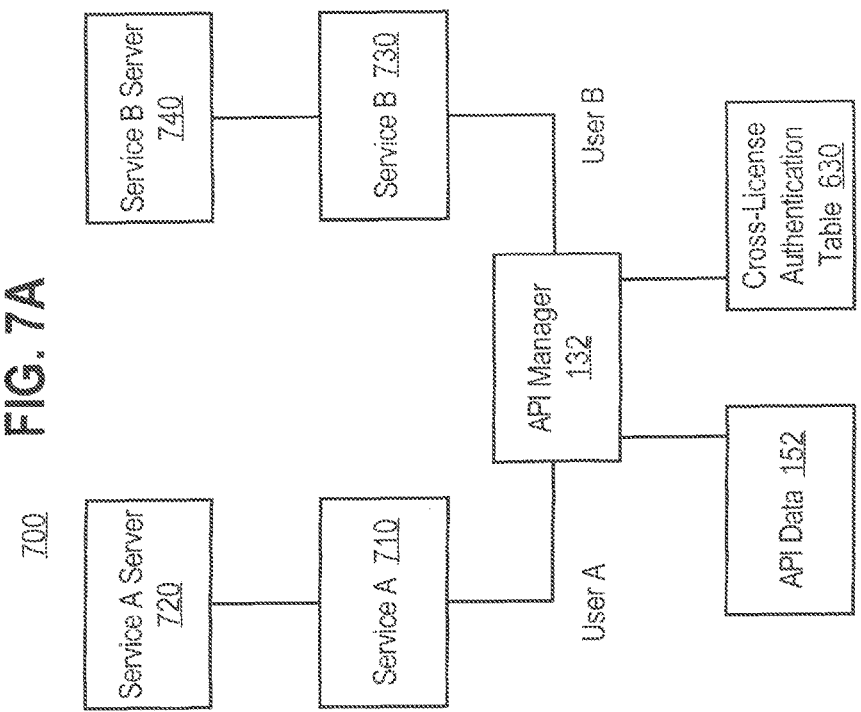
FIG. 7A is a block diagram that depicts a logical overview of cross-license collaboration that allows users to collaborate electronically using different third-party collaboration services.

FIG. 7A is a block diagram 700 that depicts a logical overview of a cross-license collaboration approach that allows users to collaborate electronically using different third-party collaboration services. In the example depicted in FIG. 7A, User A collaborates electronically with User B. User A uses Service A 710 that is hosted by Service A Server 720, and User B uses Service B 730 that is hosted by Service B Server 740. In this example, Service A 710 and Service B 730 are collaboration services, such as audio/video conferencing services, desktop sharing, application sharing, or data sharing services, etc. In addition, Service A 710 and Service B 730 support different APIs.

According to one embodiment, when a collaboration is to be performed between users, e.g., a chat session, videoconferencing session, desktop, application or content sharing session, etc., API Manager 132 determines whether more than one type of third-party collaboration service will be involved. API Manager 132 may make this determination by, for example, consulting User Status Table 640, or other data in User Data 154. If the users participating in the collaboration are using the same third-party collaboration service, then API Manager 132 uses user-specific authentication tokens from Authentication Token Table 620. For example, API Manager 132 may request, from Identity Manager 136, an authentication token for a particular third-party collaboration service, organization, and user.

If more than one type of third-party collaboration service will be used for the collaboration, then instead of using user-specific authentication tokens to access the APIs of the third-party collaboration services, API Manager 132 uses authentication tokens from Cross-License Authentication Token Table 630 that are not specific to a particular user. More specifically, API Manager 132 includes a cross-service authentication token for a particular third-party collaboration service when accessing the API of the particular third-party collaboration service.

Referring to the example depicted in FIG. 7A, when making a call to Service A 710, API Manager 132 uses an authentication token that is specific to Service A 710 and the organization. This allows API Manager 132 to generate a request that satisfies the requirements of the API for Service A 710. In addition, API Manager 132 uses the appropriate API Data 152 that corresponds to the target Third-Party Collaboration Services 108, which in the present example is Service A 710. Similarly, when making a call to Service B 730, API Manager 132 uses an authentication token that is specific to Service B 730 and the organization. In addition, API Manager 132 uses the appropriate API Data 152 that corresponds to Service B 730. According to one embodiment, the use of cross-service authentication tokens instead of user-specific authentication tokens in this manner is done irrespective of whether the users participating in the collaboration have valid individual authentication tokens for the other Third-Party Collaboration Services 108. When cross-service authentication tokens are near expiration, a notification may be issued to an administrative so that a new cross-service authentication token may be obtained.

FIG. 7B is a Flow Diagram 750 that depicts an approach for using cross-license authentication tokens. In step 752, OneLaunch Manager 106 receives a first request to perform a collaboration function. The first request may be received by OneLaunch Manager 106 from OneLaunch Application 110 and requests that a collaboration function be performed with respect to a first user on a first collaboration service and a second user on a second collaboration service. The collaboration function may be a wide variety of collaboration functions that may vary depending upon a particular implementation. In the present example, it is presumed that the first user is a user of Service A 710, the second user is a user of Service B 730, and that the collaboration function is a request to transmit a message from the first user to the second user via Service A 710 and Service B 730, respectively.

In step 754, OneLaunch Manager 106, and specifically API Manager 132, determines whether the users are using the same collaboration service. In the present example, API Manager 132 determines whether Service A 170 used by the first user is the same as Service B 730 used by the second user. This determination may be made, for example, by consulting User Status Table 640, or other data in User Data 154.

If, in step 754, a determination is made that the users are using the same collaboration service, then in step 756, OneLaunch Manager 106 generates a second request to perform the collaboration function that includes an authentication token that is specific to the first user or the second user. For example, API Manager 132 uses data from API Data 152, which defines the API of Service B 730, and an authentication token that is specific to both the first user and Service B 730, to generate a second request to transmit the message from the first user to the second user. The second request satisfies the API of Service B 730, and the authentication token is specific to the first user. For example, an authentication token from Authentication Token Table 620 for Service B may be used.

If, in step 754, a determination is made that the users are using different collaboration services, then in step 758, OneLaunch Manager 106 generates a second request to perform the collaboration function that includes an authentication token that is not specific to the first user or the second user. For example, API Manager 132 uses data from API Data 152, which defines the API of Service B 730, and an authentication token that is specific to Service B 730, but not specific to either the first user or the second user, to generate a second request to transmit the message from the first user to the second user. The second request satisfies the API of Service B 730, and the authentication token may be from Cross-License Authentication Token Table 630 for Service B 730. As is demonstrated by this example, OneLaunch Manager 106 receives requests that satisfy requirements of OneLaunch API 120, and generates requests that satisfy requirements of the APIs of target collaboration services. OneLaunch Manager 106 also handles license key management on behalf of OneLaunch Applications 110, 112, including using cross-license authentication tokens in situations where users use different collaboration services.

Authentication tokens may be manually specified by a user, for example, by an administrator of OneLaunch Manager 106. This may be done in situations, for example, where user credentials are separately registered with the particular Third-Party Collaboration Services 108. In these situations, the registration tokens issued by the Third-Party Collaboration Services 108 upon completion of registration may be manually entered into Authentication Data 156. Alternatively, authentication tokens may be issued on a per-user basis by a Third-Party Collaboration Services 108 after a user logs into the Third-Party Collaboration Services 108 via OneLaunch Manager 106. For example, Identify Manager 138 may extract authentication tokens from Login responses received from Third-Party Collaboration Services 108. Authentication tokens may have a limited lifespan and eventually expire, based upon the particular third-party collaboration service (or as manually specified by an administrative user), and must be replaced. Authentication Token Table 620 may be created and maintained by a user in Authentication Data 156, such as an administrator of OneLaunch Manager 106, and is used by Identity Manager 136 to manage functions/operations involving different Third-Party Collaboration Services 108. The number of authentication tokens for a particular Third-Party Collaboration Services 108 is equal to the number of users authorized by the license key for the particular Third-Party Collaboration Services 108.

VII. Operational Example

FIG. 8 is a message ladder diagram 800 that depicts example interaction between various elements of arrangement 100 during a login procedure. In step 802, a user initiates a login procedure via OneLaunch application 110. For example, as previously described herein with respect to FIGS. 2B, a user selects a particular third-party collaboration service to log into and in FIG. 2C, enters user credentials. In the present example, it is presumed that a particular user, User A, associated with an organization named "XYZ," requests to access a third-party collaboration service, Service A. OneLaunch Application 110 passes the user credentials for User A to OneLaunch Manager 106 via OneLaunch API 120, along with other information such as data that identifies the particular third-party collaboration service to be used, i.e., Service A, an organization associated with the user, i.e., "XYZ," and optionally other information, such as machine parameters.

In step 804, Server 122 receives and processes the data transmitted by OneLaunch Application 110. This includes, in step 804, performing a license check. According to one embodiment, this includes determining, via License Manager 140, whether a valid license key is available for the organization associated with the user. In the present example, License Manager 140 determines whether License Key Table 600 includes a valid license key for third-party collaboration service Service A and organization "XYZ." License Manager 140 generates and transmits a response to Server 122 indicating the result of the check, i.e., whether License Key Table 600 includes a valid license key for third-party collaboration service Service A and organization "XYZ." If the response from License Manager 140 indicates that a valid license key for third-party collaboration service Service A and organization "XYZ" does not exist, then Server 122 generates and transmits to OneLaunch Application 110 a message indicating this condition.

If the response from License Manager 140 indicates that a valid license key for third-party collaboration service Service A and organization "XYZ" exists, then in step 806, Server 122 performs a subscription check. According to one embodiment, this includes determining, via User Manager 134, whether the user has a current subscription to the third-party collaboration service. In the present example, User Manager 134 determines whether User Subscription Table 610 indicates that User A has a current subscription to Service A. User Manager 134 generates and transmits a response to Server 122 indicating the result of the check, i.e., whether User Subscription Table 610 indicates that User A has a current subscription to Service A. If the response from User Manager 134 indicates that User A does not have a current subscription to Service A, then Server 122 generates and transmits to OneLaunch Application 110 a message indicating this condition.

If the response from User Manager 134 indicates that User A does have a current subscription to Service A, then in step 808, Server 122 obtains an authentication token for the user. According to one embodiment, this includes Server 122 requesting, from Identify Manager 136, an authentication token for User A, with respect to Service A and organization "XYZ." Identity Manager 136 determines whether Authentication Token Table 620 includes an entry that corresponds to Service A, organization "XYZ," and User A. Identity Manager 136 generates and transmits a response to Server 122 indicating the result of the check, i.e., whether Authentication Token Table 620 includes an entry that corresponds to Service A, organization "XYZ," and User A. If such an entry exists, then the response includes the authentication token. In situations where it is known that User A will be collaborating with other users using different third-party collaboration services other than Service A, then Identify Manager 136 may provide a cross-license authentication token from Cross-License Authentication Token Table 630, as previously described herein. If the response from Identity Manager 136 indicates that Authentication Token Table 620 does not include an entry that corresponds to Service A, organization "XYZ," and User A, then Server 122 generates and transmits to OneLaunch Application 110 a message indicating this condition.

If the response from Identity Manager 136 includes an authentication token for Service A, organization "XYZ," and User A, then in step 810, Server 122 acquires API information for the third-party collaboration service to enable API Manager 132 to generate requests that satisfy requirements of the API of the third-party collaboration service. In the present example, Server 122 acquires information that defines the API of Service A, for example, via Table 500.

In step 812, Server 122 updates the status of the user to indicate that the user is now logged in. This may include, for example, Identity Manager 136 updating Presence Data 162 to indicate that User A is now logged into Service A.

VIII. Implementation Examples

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
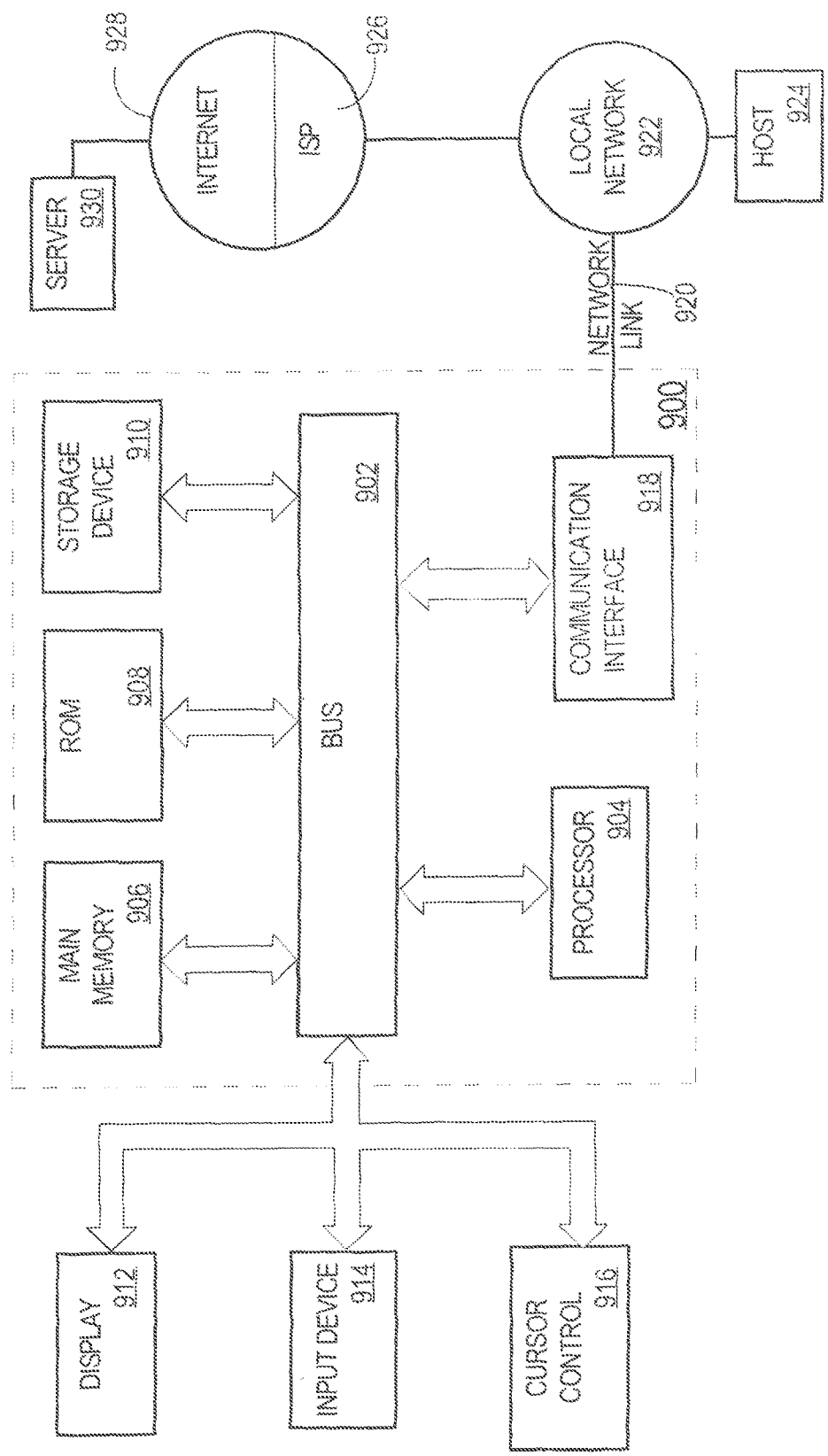
FIG. 9 is a block diagram of a computer system on which embodiments may be implemented.

FIG. 9 is a block diagram that depicts an example computer system 900 upon which embodiments may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. Although bus 902 is illustrated as a single bus, bus 902 may comprise one or more buses. For example, bus 902 may include without limitation a control bus by which processor 904 controls other devices within computer system 900, an address bus by which processor 904 specifies memory locations of instructions for execution, or any other type of bus for transferring data or signals between components of computer system 900.

An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic or computer software which, in combination with the computer system, causes or programs computer system 900 to be a special-purpose machine. According to one embodiment, those techniques are performed by computer system 900 in response to processor 904 processing instructions stored in main memory 906. Such instructions may be read into main memory 906 from another non-transitory computer-readable medium, such as storage device 910. Processing of the instructions contained in main memory 906 by processor 904 causes performance of the functionality described herein. In alternative embodiments, hard-wired circuitry may be used in place of or in combination with software instructions to implement the embodiments. Thus, embodiments are not limited to any specific combination of hardware circuitry and software.

The term "non-transitory computer-readable medium" as used herein refers to any non-transitory medium that participates in providing data that causes a computer to operate in a specific manner. In an embodiment implemented using computer system 900, various computer-readable media are involved, for example, in providing instructions to processor 904 for execution. Such media may take many forms, including but not limited to, non-volatile and volatile non-transitory media. Non-volatile non-transitory media includes, for example, optical or magnetic disks, such as storage device 910. Volatile non-transitory media includes dynamic memory, such as main memory 906. Common forms of non-transitory computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of non-transitory computer-readable media may be involved in storing instructions for processing by processor 904. For example, the instructions may initially be stored on a storage medium of a remote computer and transmitted to computer system 900 via one or more communications links. Bus 902 carries the data to main memory 906, from which processor 904 retrieves and processes the instructions. The instructions received by main memory 906 may optionally be stored on storage device 910 either before or after processing by processor 904.

Computer system 900 also includes a communication interface 918 coupled to bus 902. Communication interface 918 provides a communications coupling to a network link 920 that is connected to a local network 922. For example, communication interface 918 may be a modem to provide a data communication connection to a telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be processed by processor 904 as it is received, and/or stored in storage device 910, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more processors, and
   one or more memories storing instructions which, when processed by the one or more processors, cause a management service to:
   receive, from an application executing on an Interactive Whiteboard (IWB) appliance, a first request to perform a content collaboration function with respect to a first user on a first collaboration service and a second user on a second collaboration service, wherein both the first collaboration service and the second collaboration service are external to both the application executing on the IWB appliance and the apparatus,
   wherein the management service supports a first Application Program Interface (API), the first collaboration service supports a second API that is different than the first API, a second collaboration service supports a third API that is different from both the first API and the second API, and the first request to perform the collaboration function with respect to the first user on a first collaboration service and the second user on a second collaboration service satisfies requirements of the first API,
   determine whether the first collaboration service is the same as the second collaboration service,
   in response to determining that the first collaboration service is not the same as the second collaboration service, generate, based upon the first request to perform the collaboration function with respect to the first user on a first collaboration service and the second user on a second collaboration service, a second request to perform the collaboration function with respect to the first user on the first collaboration service and the second user on the second collaboration service, wherein the second request to perform the collaboration function with respect to the first user on the first collaboration service and the second user on the second collaboration service includes an authentication token that is specific to the first collaboration service or the second collaboration service, but not specific to either the first user or the second user, and wherein the second request to perform the collaboration function with respect to the first user on the first collaboration service and the second user on the second collaboration service satisfies requirements of the second API or the third API, but not requirements of the first API, and
   cause the second request, that includes the authentication token that is specific to the first collaboration service or the second collaboration service, but not specific to either the first user or the second user, to perform the collaboration function with respect to the first user on the first collaboration service and the second user on the second collaboration service, to be transmitted to the first collaboration service or the second collaboration service.

2. The apparatus as recited in claim 1, wherein the one or more memories store additional instructions which, when processed by the one or more processors, cause:
   the management service to maintain the authentication token along with a plurality of other authentication tokens that are specific to the first collaboration service or the second collaboration service, but not specific to either the first user or the second user, and
   the management service to generate and transmit a notification when the authentication token is near or at expiration.

3. The apparatus as recited in claim 1, wherein the one or more memories store additional instructions which, when processed by the one or more processors, cause:
   in response to determining that the first collaboration service is the same as the second collaboration service, generate, based upon the first request to perform the collaboration function with respect to the first user on a first collaboration service and the second user on a second collaboration service, a second request to perform the collaboration function with respect to the first user on the first collaboration service and the second user on the second collaboration service, wherein the second request to perform the collaboration function with respect to the first user on the first collaboration service and the second user on the second collaboration service includes the authentication token that is specific to the first collaboration service, the second collaboration service, and the first user, and cause the second request, that includes the authentication token that is specific to the first collaboration service, the second collaboration service, and the first user, to perform the collaboration function with respect to the first user on the first collaboration service and the second user on the second collaboration service, to be transmitted to the first collaboration service or the second collaboration service.

4. The apparatus as recited in claim 1, wherein the second request to perform the collaboration function with respect to the first user on the first collaboration service and the second user on the second collaboration service is specific to a particular organization that corresponds to the first user.

5. The apparatus as recited in claim 1, wherein the one or more memories store additional instructions which, when processed by the one or more processors, cause:
the management service to perform a license check by determining whether an active license key for the first collaboration service is available for an organization to which the first user belongs.

6. The apparatus as recited in claim 1, wherein the one or more memories store additional instructions which, when processed by the one or more processors, cause:
the management service to perform a subscription check by determining whether the first user is currently subscribed to the first collaboration service in conjunction with an organization to which the first user belongs.

7. One or more non-transitory computer-readable media storing instructions which, when processed by one or more processors, cause a management service executing on one or more computing devices to:
receive, from an application executing on an Interactive Whiteboard (IWB) appliance, a first request to perform a content collaboration function with respect to the first user on a first collaboration service and a second user on a second collaboration service, wherein both the first collaboration service and the second collaboration service are external to both the application executing on the IWB appliance and the one or more computing devices,
wherein the management service supports a first Application Program Interface (API), the first collaboration service supports a second API that is different than the first API, the second collaboration service supports a third API that is different from both the first API and the second API, and the first request to perform the collaboration function with respect to the first user on a first collaboration service and the second user on a second collaboration service satisfies requirements of the first API,
determine whether the first collaboration service is the same as the second collaboration service,
in response to determining that the first collaboration service is not the same as the second collaboration service, generate, based upon the first request to perform the collaboration function with respect to the first user on a first collaboration service and the second user on a second collaboration service, a second request to perform the collaboration function with respect to the first user on the first collaboration service and the second user on the second collaboration service, wherein the second request to perform the collaboration function with respect to the first user on the first collaboration service and the second user on the second collaboration service includes an authentication token that is specific to the first collaboration service or the second collaboration service, but not specific to either the first user or the second user, and wherein the second request to perform the collaboration function with respect to the first user on the first collaboration service and the second user on the second collaboration service satisfies requirements of the second API or the third API, but not requirements of the first API, and
cause the second request, that includes the authentication token that is specific to the first collaboration service or the second collaboration service, but not specific to either the first user or the second user, to perform the collaboration function with respect to the first user on the first collaboration service and the second user on the second collaboration service, to be transmitted to the first collaboration service or the second collaboration service.

8. The one or more non-transitory computer-readable media as recited in claim 7, further comprising additional instructions which, when processed by the one or more processors, cause:
the management service executing on the one or more computing devices to maintain the authentication token along with a plurality of other authentication tokens that are specific to the first collaboration service or the second collaboration service, but not specific to either the first user or the second user, and
the management service to generate and transmit a notification when the authentication token is near or at expiration.

9. The one or more non-transitory computer-readable media as recited in claim 7, further comprising additional instructions which, when processed by the one or more processors, cause:
in response to determining that the first collaboration service is the same as the second collaboration service, the management process executing on the one or more computing devices to generate, based upon the first request to perform the collaboration function with respect to the first user on a first collaboration service and the second user on a second collaboration service, a second request to perform the collaboration function with respect to the first user on the first collaboration service and the second user on the second collaboration service, wherein the second request to perform the collaboration function with respect to the first user on the first collaboration service and the second user on the second collaboration service includes the authentication token that is specific to the first collaboration service, the second collaboration service, and the first user, and
the management process executing on the one or more computing devices to cause the second request, that includes the authentication token that is specific to the first collaboration service, the second collaboration service, and the first user, to perform the collaboration function with respect to the first user on the first collaboration service and the second user on the second collaboration service, to be transmitted to the first collaboration service or the second collaboration service.

10. The one or more non-transitory computer-readable media as recited in claim 7, wherein the second request to perform the collaboration function with respect to the first user on the first collaboration service and the second user on the second collaboration service is specific to a particular organization that corresponds to the first user.

11. The one or more non-transitory computer-readable media as recited in claim 7, further comprising additional instructions which, when processed by the one or more processors, cause:
the management service executing on the one or more computing devices to perform a license check by determining whether an active license key for the first collaboration service is available for an organization to which the first user belongs.

12. The one or more non-transitory computer-readable media as recited in claim 7, further comprising additional instructions which, when processed by the one or more processors, cause:
the management service executing on the one or more computing devices to perform a subscription check by determining whether the first user is currently subscribed to the first collaboration service in conjunction with an organization to which the first user belongs.

13. A computer-implemented method comprising:
a management service executing on one or more computing devices receiving, from an application executing on an Interactive Whiteboard (IWB) appliance, a first request to perform a content collaboration function with respect to a first user on a first collaboration service and a second user on a second collaboration service, wherein both the first collaboration service and the second collaboration service are external to both the application executing on the IWB appliance and the one or more computing devices,
wherein the management service supports a first Application Program Interface (API), the first collaboration service supports a second API that is different than the first API, the second collaboration service supports a third API that is different from both the first API and the second API, and the first request to perform the collaboration function with respect to the first user on a first collaboration service and the second user on a second collaboration service satisfies requirements of the first API,
the management service executing on the one or more computing devices determining whether the first collaboration service is the same as the second collaboration service,
in response to determining that the first collaboration service is not the same as the second collaboration service, the management service executing on the one or more computing devices generating, based upon the first request to perform the collaboration function with respect to the first user on a first collaboration service and the second user on a second collaboration service, a second request to perform the collaboration function with respect to the first user on the first collaboration service and the second user on the second collaboration service, wherein the second request to perform the collaboration function with respect to the first user on the first collaboration service and the second user on the second collaboration service includes an authentication token that is specific to the first collaboration service or the second collaboration service, but not specific to either the first user or the second user, and wherein the second request to perform the collaboration function with respect to the first user on the first collaboration service and the second user on the second collaboration service satisfies requirements of the second API or the third API, but not requirements of the first API, and
cause the second request, that includes the authentication token that is specific to the first collaboration service or the second collaboration service, but not specific to either the first user or the second user, to perform the collaboration function with respect to the first user on the first collaboration service and the second user on the second collaboration service, to be transmitted to the first collaboration service or the second collaboration service.

14. The computer-implemented method as recited in claim 13, further comprising:
the management service executing on the one or more computing devices maintaining the authentication token along with a plurality of other authentication tokens that are specific to the first collaboration service or the second collaboration service, but not specific to either the first user or the second user, and
the management service executing on the one or more computing devices generating and transmitting a notification when the authentication token is near or at expiration.

15. The computer-implemented method as recited in claim 13, further comprising:
in response to determining that the first collaboration service is the same as the second collaboration service, the management service executing on the one or more computing devices generating, based upon the first request to perform the collaboration function with respect to the first user on a first collaboration service and the second user on a second collaboration service, a second request to perform the collaboration function with respect to the first user on the first collaboration service and the second user on the second collaboration service, wherein the second request to perform the collaboration function with respect to the first user on the first collaboration service and the second user on the second collaboration service includes the authentication token that is specific to the first collaboration service, the second collaboration service, and the first user, and
the management service executing on the one or more computing devices causing the second request, that includes the authentication token that is specific to the first collaboration service, the second collaboration service, and the first user, to perform the collaboration function with respect to the first user on the first collaboration service and the second user on the second collaboration service, to be transmitted to the first collaboration service or the second collaboration service.

16. The computer-implemented method as recited in claim 13, wherein the second request to perform the collaboration function with respect to the first user on the first collaboration service and the second user on the second collaboration service is specific to a particular organization that corresponds to the first user.

17. The computer-implemented method as recited in claim 13, further comprising:
the management service executing on the one or more computing devices performing a license check by determining whether an active license key for the first collaboration service is available for an organization to which the first user belongs.

* * * * *